United States Patent
Chen et al.

(10) Patent No.: US 12,495,168 B2
(45) Date of Patent: Dec. 9, 2025

(54) CONSTRAINED CODING TREE FOR VIDEO CODING

(71) Applicant: Huawei Technologies Co., Ltd., Shenzhen (CN)

(72) Inventors: Jianle Chen, San Diego, CA (US); Yin Zhao, Guangdong (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/194,459

(22) Filed: Mar. 31, 2023

(65) Prior Publication Data

US 2023/0239518 A1 Jul. 27, 2023

Related U.S. Application Data

(60) Division of application No. 17/150,968, filed on Jan. 15, 2021, now abandoned, which is a continuation of
(Continued)

(51) Int. Cl.
*H04N 19/96* (2014.01)
*H04N 19/169* (2014.01)

(52) U.S. Cl.
CPC ......... *H04N 19/96* (2014.11); *H04N 19/1883* (2014.11)

(58) Field of Classification Search
CPC .. H04N 19/96; H04N 19/1883; H04N 19/119; H04N 19/176; H04N 19/186; H04N 19/122; H04N 19/70
(Continued)

(56) References Cited

U.S. PATENT DOCUMENTS

| 2013/0022127 A1 | 1/2013 | Park et al. |
| 2013/0028329 A1* | 1/2013 | Lou ............... H04N 19/176 375/240.18 |

(Continued)

FOREIGN PATENT DOCUMENTS

| CN | 102835113 A | 12/2012 |
| WO | 2017157249 A1 | 9/2017 |

(Continued)

OTHER PUBLICATIONS

Hsu et al. ("CE1-related: Constraint for binary and ternary partitions", JVET-K0556-v2, Jul. 16, 2018), pp. 1-2, 11, 13. (Year: 2018).*

(Continued)

*Primary Examiner* — Matthew K Kwan
(74) *Attorney, Agent, or Firm* — Conley Rose, P.C.

(57) ABSTRACT

A video coding mechanism is disclosed. The mechanism includes partitioning an image to create at least one coding tree unit (CTU) with at least one coding tree node. The mechanism further includes determining that the coding tree node height is twice a maximum transform unit (TU) height and the coding tree node width is twice a maximum TU width. The mechanism further includes selecting a split mode for the coding tree node based on the determination. The split mode is selected from a quad-tree split, a horizontal binary-tree split, and no split. The mechanism further includes applying the split mode to the coding tree node to create one or more coding units (CUs). The mechanism further includes encoding the CUs into a bitstream. The mechanism further includes transmitting the bitstream toward a decoder.

14 Claims, 15 Drawing Sheets

Related U.S. Application Data application No. PCT/US2019/040174, filed on Jul. 1, 2019.

(60) Provisional application No. 62/699,489, filed on Jul. 17, 2018.

(58) Field of Classification Search
USPC .................................................. 375/240.01
See application file for complete search history.

(56) References Cited

U.S. PATENT DOCUMENTS

| | | | |
|---|---|---|---|
| 2013/0107970 | A1 | 5/2013 | Wang et al. |
| 2015/0249828 | A1 | 9/2015 | Rosewarne et al. |
| 2016/0134889 | A1 | 5/2016 | Park et al. |
| 2018/0020241 | A1 | 1/2018 | Li et al. |
| 2018/0077417 | A1* | 3/2018 | Huang .................. H04N 19/70 |
| 2019/0124366 | A1 | 4/2019 | Zhao et al. |
| 2021/0021848 | A1 | 1/2021 | Nam et al. |
| 2021/0368172 | A1* | 11/2021 | Lim ..................... H04N 19/119 |

FOREIGN PATENT DOCUMENTS

| | | | |
|---|---|---|---|
| WO | 2017203930 | A1 | 11/2017 |
| WO | 2018030599 | A1 | 2/2018 |
| WO | 2019173416 | A1 | 9/2019 |
| WO | 2019194463 | A1 | 10/2019 |

OTHER PUBLICATIONS

Bross et al. ("Versatile Video Coding (Draft 1)", JVET-J1001-v2, Jun. 15, 2018). A copy has been provided by Applicant on Sep. 16, 2024. (Year: 2018).*

Sullivan, G., et al., "Overview of the high efficiency video coding (HEVC) standard," IEEE Transactions on Circuits and Systems for Video Technology, vol. 22, No. 12, Dec. 2012, 20 pages.

Document: JVET-K0556-v1, Hsu, C., et al., "CE1-related: Constraint for binary and ternary partitions," Joint Video Experts Team (JVET) of ITU-T SG 16 WP 3 and ISO/IEC JTC 1/SC 29/WG 11, 11th Meeting: Ljubljana, SI, Jul. 10-18, 2018, 5 pages.

Document: JVET-K0021-v4, Ma, J et al., "CE1: Summary report on partitioning", Joint Video Experts Team (JVET) of ITU-T SG 16 WP 3 and ISO/IEC JTC1/SC29/WG11 11th Meeting: Ljubljana, SI, Jul. 10-18, 2018, 36 pages.

Document: JVET-D0117r1, "Multi-Type-Tree," Joint Video Exploration Team (JVET) of ITU-T SG 16 WP 3 and ISO/IEC JTC 1/SC 29/WG 11, 4th Meeting: Chengdu, CN, Oct. 15-21, 2016 3 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

"Series H: Audiovisual and Multimedia Systems Infrastructure of audiovisual services—Transmission multiplexing and synchronization Multiplexing protocol for low bit rate multimedia communication," ITU-T Recommendation H.223, Jul. 2001, 74 pages.

Document: JVET-J1001-v2, Bross, B., "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 43 pages.

* cited by examiner

CONSTRAINED CODING TREE FOR VIDEO CODING

CROSS-REFERENCE TO RELATED APPLICATIONS

This patent application is a divisional application of U.S. application Ser. No. 17/150,968 filed on Jan. 15, 2021 by Jianle Chen, et. al., and titled "Constrained Coding Tree For Video Coding," which claims the benefit of International Application No. PCT/US2019/040174, filed Jul. 1, 2019 by Jianle Chen, et. al., and titled "Constrained Coding Tree For Video Coding," and U.S. Provisional Patent Application No. 62/699,489, filed Jul. 17, 2018 by Jianle Chen, et. al., and titled "Constrained Coding Tree For Video Coding," all of which are hereby incorporated by reference in their entireties.

TECHNICAL FIELD

The present disclosure is generally related to video coding, and is specifically related to generating coding trees for partitioning coding tree units (CTUs) in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in an encoder. The method comprises partitioning, by a processor of the encoder, an image to create at least one coding tree unit (CTU) with at least one coding tree node. The method further comprises determining, by the processor, that a height of the coding tree node is twice a maximum transform unit (TU) height and a width of the coding tree node is twice a maximum TU width. The method further comprises selecting, by the processor, a split mode for the coding tree node based on the determination that the coding tree node height is twice the maximum TU height and the coding tree node width is twice the maximum TU width, the split mode selected from a quad-tree split, a horizontal binary-tree split, and no split. The method further comprises applying, by the processor, the split mode to the coding tree node to create one or more coding units (CUs). The method further comprises encoding, by the processor, the CUs into a bitstream. The method further comprises transmitting, by a transmitter of the encoder, the bitstream toward a decoder. The abovementioned mechanism can improve CTU partitioning to mitigate the potential for a CU to be partitioned across pipeline block boundaries. Specifically, a constrained coding tree is applied to the CTU, where the constrained coding tree includes rules to prevent splits that would break the pipeline structure. This allows for faster coding when such a pipeline structure is employed.

Optionally, in any of the preceding aspects, another implementation of the aspect provides, wherein the split mode is not selected from a vertical binary-tree split, a vertical triple-tree split, and a horizontal triple-tree split based on the determination that the coding tree node height is twice the maximum TU height and the coding tree node width is twice the maximum TU width.

Optionally, in any of the preceding aspects, another implementation of the aspect provides, further comprising signaling the split mode for the coding tree node in the bitstream by encoding a first flag to indicate whether the split mode is a quad-tree split and a second flag to indicate whether the split mode is a horizontal binary-tree split or no split.

Optionally, in any of the preceding aspects, another implementation of the aspect provides, wherein the first flag is a qt_split_cu_flag and the second flag is a mtt_split_cu_flag.

In an embodiment, the disclosure includes a method implemented in an encoder. The method comprises partitioning, by a processor of the encoder, an image to create at least one CTU with at least one coding tree node. The method further comprises determining, by the processor, that a height of the coding tree node is not larger than a maximum TU height and a width of the coding tree node is twice a maximum TU width. The method further comprises selecting, by the processor, a split mode for the coding tree node based on the determination that the coding tree node height is not larger than the maximum TU height and the coding tree node width is twice the maximum TU width, the split mode selected from a vertical binary-tree split and no split. The method further comprises applying, by the processor, the split mode to the coding tree node to create one or more coding units (CUs). The method further comprises encoding, by the processor, the CUs into a bitstream. The method further comprises transmitting, by a transmitter of the encoder, the bitstream toward a decoder. The abovementioned mechanism can improve CTU partitioning to mitigate the potential for a CU to be partitioned across pipeline block boundaries. Specifically, a constrained coding tree is applied to the CTU, where the constrained coding tree includes rules to prevent splits that would break the pipeline structure. This allows for faster coding when such a pipeline structure is employed.

Optionally, in any of the preceding aspects, another implementation of the aspect provides, wherein the split mode is not selected from a horizontal binary-tree split, a quad-tree split, a vertical triple-tree split, and a horizontal triple-tree split based on the determination that the coding tree node height is not larger than the maximum TU height and the coding tree node width is twice the maximum TU width.

Optionally, in any of the preceding aspects, another implementation of the aspect provides, further comprising signaling the split mode for the coding tree node in the bitstream by encoding a first flag to indicate whether the split mode is a vertical binary-tree split or a no split.

In an embodiment, the disclosure includes a video coding device comprising a processor and a transmitter coupled to the processor, the processor and transmitter configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes an encoder comprising a partitioning means for partitioning an image to create at least one CTU with at least one coding tree node. The encoder further comprises a size determination means for determining that a height of the coding tree node is twice a maximum TU height and a width of the coding tree node is twice a maximum TU width. The encoder further comprises a split mode selection means for selecting a split mode for the coding tree node based on the determination that the coding tree node height is twice the maximum TU height and the coding tree node width is twice the maximum TU width, a horizontal binary-tree split, and no split. The encoder further comprises a split mode application means for applying the split mode to the coding tree node to create one or more CUs. The encoder further comprises an encoding means for encoding the CUs into a bitstream. The encoder further comprises a transmitting means for transmitting the bitstream toward a decoder. The abovementioned mechanism can improve CTU partitioning to mitigate the potential for a CU to be partitioned across pipeline block boundaries. Specifically, a constrained coding tree is applied to the CTU, where the constrained coding tree includes rules to prevent splits that would break the pipeline structure. This allows for faster coding when such a pipeline structure is employed.

Optionally, in any of the preceding aspects, another implementation of the aspect provides, wherein the encoder is further configured to perform the method of any of the preceding aspects.

In an embodiment, the disclosure includes an encoder comprising a partitioning means for partitioning an image to create at least one CTU with at least one coding tree node. The encoder further comprises a size determination means for determining that a height of the coding tree node is not larger than a maximum TU height and a width of the coding tree node is twice a maximum TU width. The encoder further comprises a split mode selection means for selecting a split mode for the coding tree node based on the determination that the coding tree node height is not larger than the maximum TU height and the coding tree node width is twice the maximum TU width, the split mode selected from a vertical binary-tree split and no split. The encoder further comprises a split mode application means for applying the split mode to the coding tree node to create one or more CUs. The encoder further comprises an encoding means for encoding the CUs into a bitstream. The encoder further comprises a transmitting means for transmitting the bitstream toward a decoder. The abovementioned mechanism can improve CTU partitioning to mitigate the potential for a CU to be partitioned across pipeline block boundaries. Specifically, a constrained coding tree is applied to the CTU, where the constrained coding tree includes rules to prevent splits that would break the pipeline structure. This allows for faster coding when such a pipeline structure is employed.

Optionally, in any of the preceding aspects, another implementation of the aspect provides, wherein the encoder is further configured to perform the method of any of the preceding aspects.

In an embodiment, the disclosure includes a method implemented in a decoder. The method comprises receiving, by a receiver of the decoder, a bitstream including image data. The method further comprises partitioning, by a processor of the decoder, the image data to create at least one CTU with at least one coding tree node. The method further comprises determining, by the processor, that a height of the coding tree node is twice a maximum TU height and a width of the coding tree node is twice a maximum TU width. The method further comprises parsing, by the processor, the bitstream to determine a split mode for the coding tree node based on the determination that the coding tree node height is twice the maximum TU height and the coding tree node width is twice the maximum TU width, the split mode selected from a quad-tree split, a horizontal binary-tree split, and no split. The method further comprises applying, by the processor, the split mode to the coding tree node to obtain one or more CUs. The method further comprises decoding, by the processor, the CUs based on the bitstream to create an image. The method further comprises forwarding, by the processor, the image toward a display. The abovementioned mechanism can improve CTU partitioning to mitigate the potential for a CU to be partitioned across pipeline block boundaries. Specifically, a constrained coding tree is applied to the CTU, where the constrained coding tree includes rules to prevent splits that would break the pipeline structure. This allows for faster coding when such a pipeline structure is employed.

Optionally, in any of the preceding aspects, another implementation of the aspect provides, wherein the split mode is not selected from a vertical binary-tree split, a vertical triple-tree split, and a horizontal triple-tree split based on the determination that the coding tree node height is twice the maximum TU height and the coding tree node width is twice the maximum TU width.

Optionally, in any of the preceding aspects, another implementation of the aspect provides, wherein parsing the bitstream to determine the split mode for the coding tree node includes parsing a first flag to determine whether the split mode is a quad-tree split.

Optionally, in any of the preceding aspects, another implementation of the aspect provides, wherein parsing the bitstream to determine the split mode for the coding tree node further includes parsing a second flag to determine whether the split mode is a horizontal binary-tree split or no split.

Optionally, in any of the preceding aspects, another implementation of the aspect provides, wherein the first flag is a qt_split_cu_flag and the second flag is a mtt_split_cu_flag.

In an embodiment, the disclosure includes a method implemented in a decoder. The method comprises receiving, by a receiver of the decoder, a bitstream including image data. The method further comprises partitioning, by a processor of the decoder, the image data to create at least one CTU with at least one coding tree node. The method further comprises determining, by the processor, that a height of the coding tree node is not larger than a maximum TU height and a width of the coding tree node is twice a maximum TU width. The method further comprises parsing, by the processor, the bitstream to determine a split mode for the coding tree node based on the determination that the coding tree node height is not larger than the maximum TU height and the coding tree node width is twice the maximum TU width, the split mode selected from a vertical binary-tree split and no split. The method further comprises applying, by the processor, the split mode to the coding tree node to obtain one or more CUs. The method further comprises decoding, by the processor, the CUs based on the bitstream to create an image. The method further comprises forwarding, by the processor, the image toward a display. The abovementioned mechanism can improve CTU partitioning to mitigate the potential for a CU to be partitioned across pipeline block boundaries. Specifically, a constrained coding tree is applied to the CTU, where the constrained coding tree includes rules to prevent splits that would break the pipeline structure. This allows for faster coding when such a pipeline structure is employed.

Optionally, in any of the preceding aspects, another implementation of the aspect provides, wherein the split mode is not selected from a horizontal binary-tree split, a quad-tree split, a vertical triple-tree split, and a horizontal triple-tree split based on the determination that the coding tree node height is not larger than the maximum TU height and the coding tree node width is twice the maximum TU width.

Optionally, in any of the preceding aspects, another implementation of the aspect provides, wherein parsing the bitstream to determine the split mode for the coding tree node includes parsing a first flag to determine whether the split mode is a vertical binary-tree split or a no split.

In an embodiment, the disclosure includes a video coding device comprising a processor and a receiver coupled to the processor, the processor and receiver configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising a receiving means for receiving a bitstream including image data. The decoder further comprises a partitioning means for partitioning the image data to create at least one CTU with at least one coding tree node. The decoder further comprises a size determination means for determining that a height of the coding tree node is twice a maximum TU height and a width of the coding tree node is twice a maximum TU width. The decoder further comprises a split mode determination means for parsing the bitstream to determine a split mode for the coding tree node based on the determination that the coding tree node height is twice the maximum TU height and the coding tree node width is twice the maximum TU width, the split mode selected from a quad-tree split, a horizontal binary-tree split, and no split. The decoder further comprises a split mode application means for applying the split mode to the coding tree node to obtain one or more CUs. The decoder further comprises a decoding means for decoding the CUs based on the bitstream to create an image. The decoder further comprises a display means for forwarding the image toward a display. The abovementioned mechanism can improve CTU partitioning to mitigate the potential for a CU to be partitioned across pipeline block boundaries. Specifically, a constrained coding tree is applied to the CTU, where the constrained coding tree includes rules to prevent splits that would break the pipeline structure. This allows for faster coding when such a pipeline structure is employed.

Optionally, in any of the preceding aspects, another implementation of the aspect provides, wherein the decoder is further configured to perform the method of any of the preceding aspects.

In an embodiment, the disclosure includes a decoder comprising a receiving means for receiving a bitstream including image data. The decoder further comprises a partitioning means for partitioning the image data to create at least one CTU with at least one coding tree node. The decoder further comprises a size determination means for determining that a height of the coding tree node is not larger than a maximum TU height and a width of the coding tree node is twice a maximum TU width. The decoder further comprises a split mode determination means for parsing the bitstream to determine a split mode for the coding tree node based on the determination that the coding tree node height is not larger than the maximum TU height and the coding tree node width is twice the maximum TU width, the split mode selected from a vertical binary-tree split and no split. The decoder further comprises a split mode application means for applying the split mode to the coding tree node to obtain one or more CUs. The decoder further comprises a decoding means for decoding the CUs based on the bitstream to create an image. The decoder further comprises a display means for forwarding the image toward a display. The abovementioned mechanism can improve CTU partitioning to mitigate the potential for a CU to be partitioned across pipeline block boundaries. Specifically, a constrained coding tree is applied to the CTU, where the constrained coding tree includes rules to prevent splits that would break the pipeline structure. This allows for faster coding when such a pipeline structure is employed.

Optionally, in any of the preceding aspects, another implementation of the aspect provides, wherein the decoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
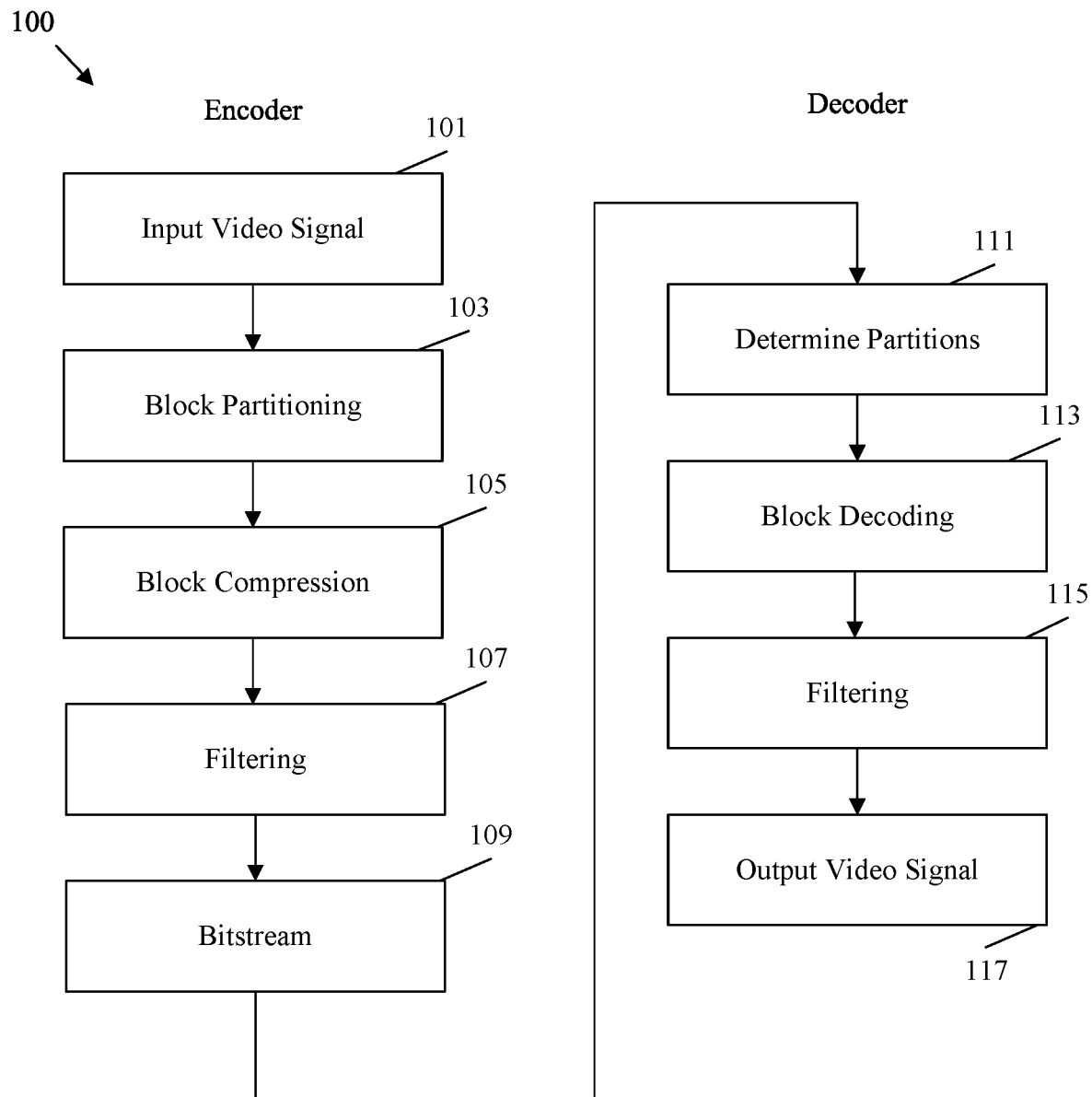
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding includes partitioning video frames (also referred to as pictures) into blocks and encoding the blocks via intra-prediction and inter-prediction to compress the size of a video file. The present disclosure relates to improvements in the partitioning process. Specifically, a video frame is partitioned into slices, which may extend horizontally across the frame. Each slice is then sub-divided into coding tree units (CTUs) of a predetermined size. CTUs may vary in size across the slice, for example when the number of pixels in a row or column of the slice is not evenly divisible by the CTU width or height, respectively. A coding tree is then applied to each CTU to further sub-divide the CTU into coding units (CUs). Each CU contains luma (e.g., light) and chroma (e.g., color) blocks that can be encoded and decoded via inter-prediction and intra-prediction.

A coding tree includes one or more coding tree nodes that are processed in order to split the CTU into CUs. A coding tree node is a set or sub-set of pixels included in the CTU that is designated for application of a corresponding split mode. Coding tree nodes are related by the coding tree in a parent/child relationship. For example, a first coding tree node in a coding tree can divide the CTU into sub-groups, and then subsequent child coding tree nodes further can sub-divide the sub-groups. Such sub-dividing can occur recursively until a condition is met (e.g., a minimum CU and/or block size is reached). Several split modes are available to the encoder in order to allow the encoder to partition the CTUs into CUs that contain relatively homogenous luma and/or chroma values. Such relatively homogenous groups of pixels can be encoded in a more efficient manner (e.g., with higher compression and fewer bits) than groups of pixels with differing values. For example, the encoder can select a quad-tree split mode that splits a coding tree node into four equal parts, a vertical binary split mode or a horizontal binary split mode that splits the coding tree node into two equal parts, and/or a vertical triple tree split mode that splits the coding tree node into three equal parts. The encoder can then signal the coding tree to the decoder in a bitstream to allow the decoder to partition the CTU for decoding purposes.

Many video codecs employ a block based pipeline design when encoding and/or decoding the partitioned CTU. Specifically, the codec encodes or decodes a sub-set of each CTU in a predefined order. As a specific example, the CTU can be organized into sub-portions, and then the sub-portions can be encoded and/or decoded from left to right and top to bottom. Such sub-portions can also be referred to as pipeline blocks (not to be confused with coding blocks). For example, the CTU can be organized into S×S pipeline blocks (or 2S×2S, 2S×S, S×2S, etc.) where the value of S is the size of a maximum transform unit (TU). The TU is a transform function applied spatially to a coding block of residual values resulting from the coding process (e.g., inter-prediction or intra-prediction). Once organized into pipeline blocks, the CTU can be coded according to the pipeline, for example a top left section, a top right section, a bottom left section, and then a bottom right section. Unfortunately, application of certain split modes to the CTU (and coding tree nodes thereof) can create CUs that do not fall perfectly into the pipeline structure, for example by creating a CU that exists in more than one pipeline block. This scenario may complicate and/or prevent pipeline based coding for the corresponding CTU.

Disclosed herein are mechanisms to improve CTU partitioning to mitigate the potential for a CU to be partitioned across pipeline block boundaries. Specifically, a constrained coding tree is applied to the CTU, where the constrained coding tree includes rules to prevent splits that would break the pipeline structure. When generating the constrained coding tree, the encoder compares the maximum TU height and maximum TU width to the height and width, respectively, of the current coding tree node. In a first example, when the coding tree node height is twice the maximum TU height and the coding tree node width is twice the maximum TU width (e.g., 128×128 pixels and/or 2S×2S), the split mode is selected from a group consisting of a quad-tree split, a horizontal binary-tree split, and no split. Accordingly, the coding tree is constrained from selecting a split mode for the coding tree node from the group of a vertical binary-tree split, a vertical triple-tree split, and a horizontal triple-tree split. As the group of potential split modes is constrained to quad-tree split, horizontal binary-tree split, and no split, the split mode can be signaled via two flags. A first flag (e.g., a qt_split_cu_flag) can signal whether the split mode is a quad-tree split and a second flag (e.g., a mtt_split_cu_flag) can signal whether the split mode is a horizontal binary-tree split or no split. In a second example, when the coding tree node height is not larger than the maximum TU height and the coding tree node width is twice the maximum TU width (e.g., 128×64 pixels denoted in width by height and/or 2S×S), the split mode is selected from a group consisting of a vertical binary-tree split and no split. Accordingly, the coding tree is constrained from selecting a split mode for the coding tree node from the group of a horizontal binary-tree, a quad-tree split, a vertical triple-tree, and a horizontal triple-tree. As the group of potential split modes is constrained to a vertical binary-tree split and no split, the split mode can be signaled via a single flag (e.g., indicating a vertical binary-tree split or a no split). As such, applying a constrained coding tree in the manner described herein increases encoding and decoding speed by preventing slowdowns associated with CUs that do not fit within pipeline blocks. Further, the constrained coding tree increases coding efficiency by reducing the number of bits employed to signal a split mode, for example to two bits for a 2S×2S coding tree node and to one bit for a 2S×S coding tree node. The disclosed constrained coding trees can be applied to CTUs in an intra-prediction (I) slice, a unidirectional inter-prediction (P) slice, and/or a bi-directional inter-prediction (B) slice.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and Motion Picture Experts Group (MPEG)-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
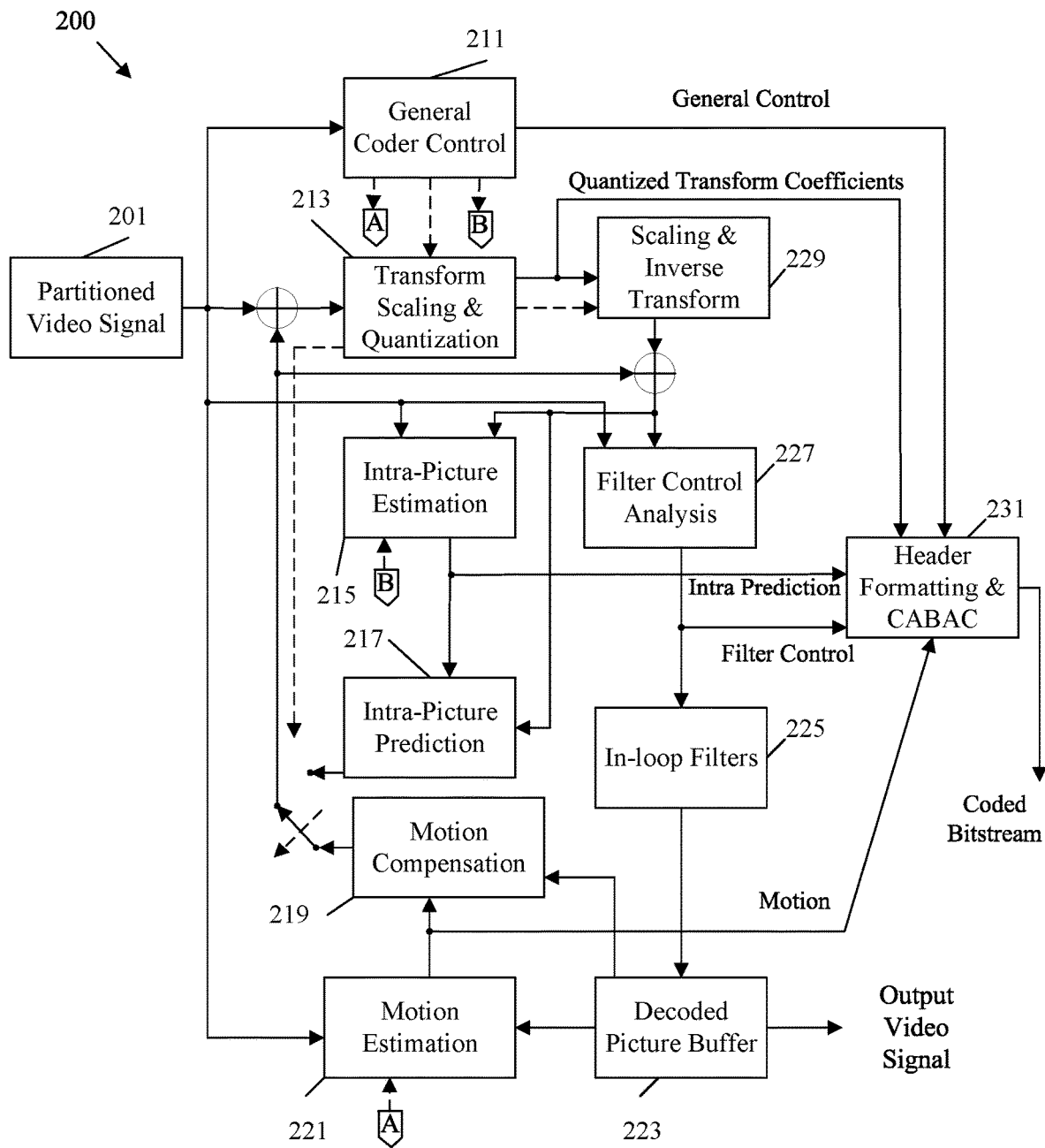
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad-tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
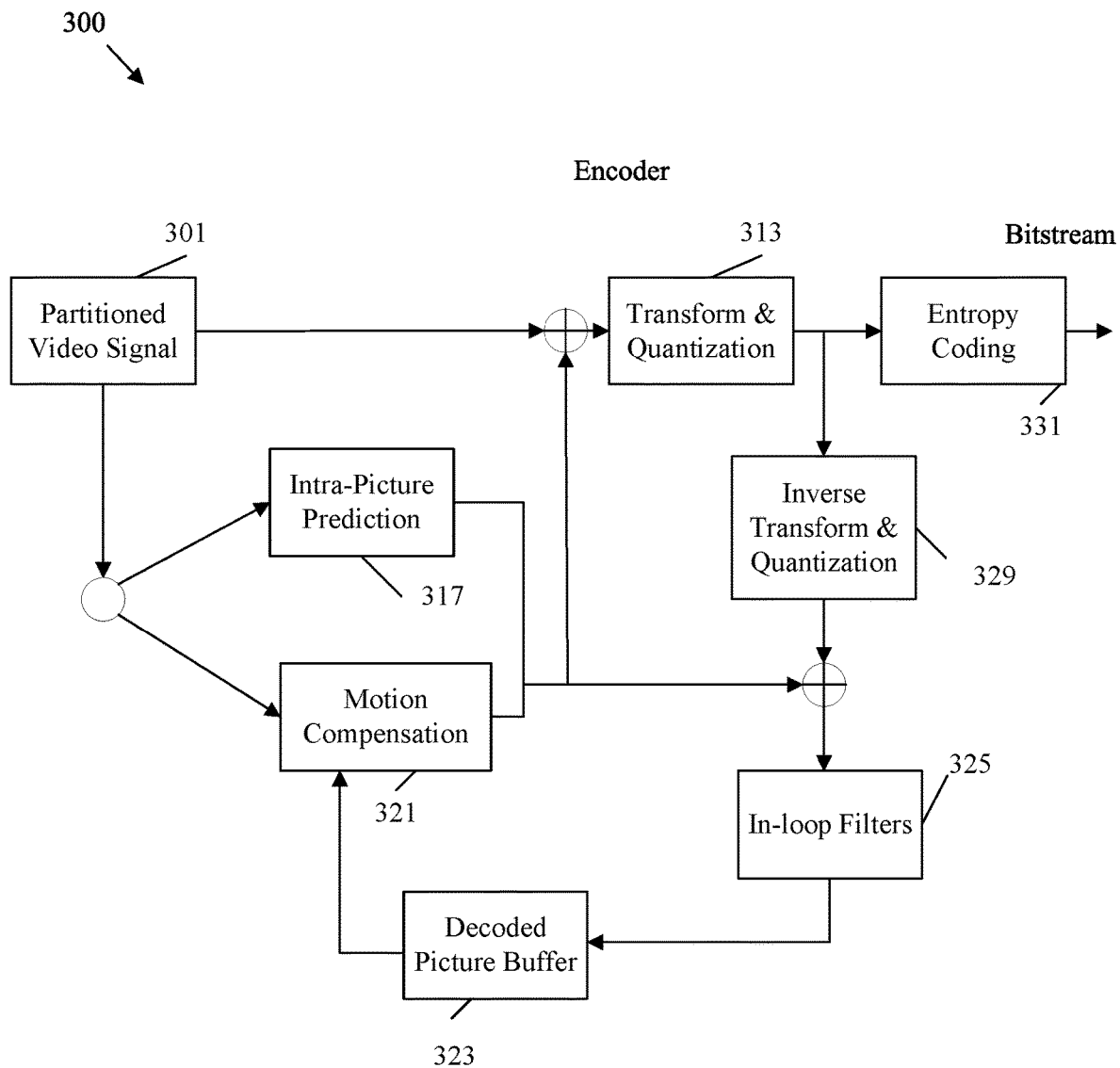
FIG. 3 is a schematic diagram illustrating an example video encoder for video coding.

FIG. 3 is a block diagram illustrating an example video encoder 300 for video coding. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream.

The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
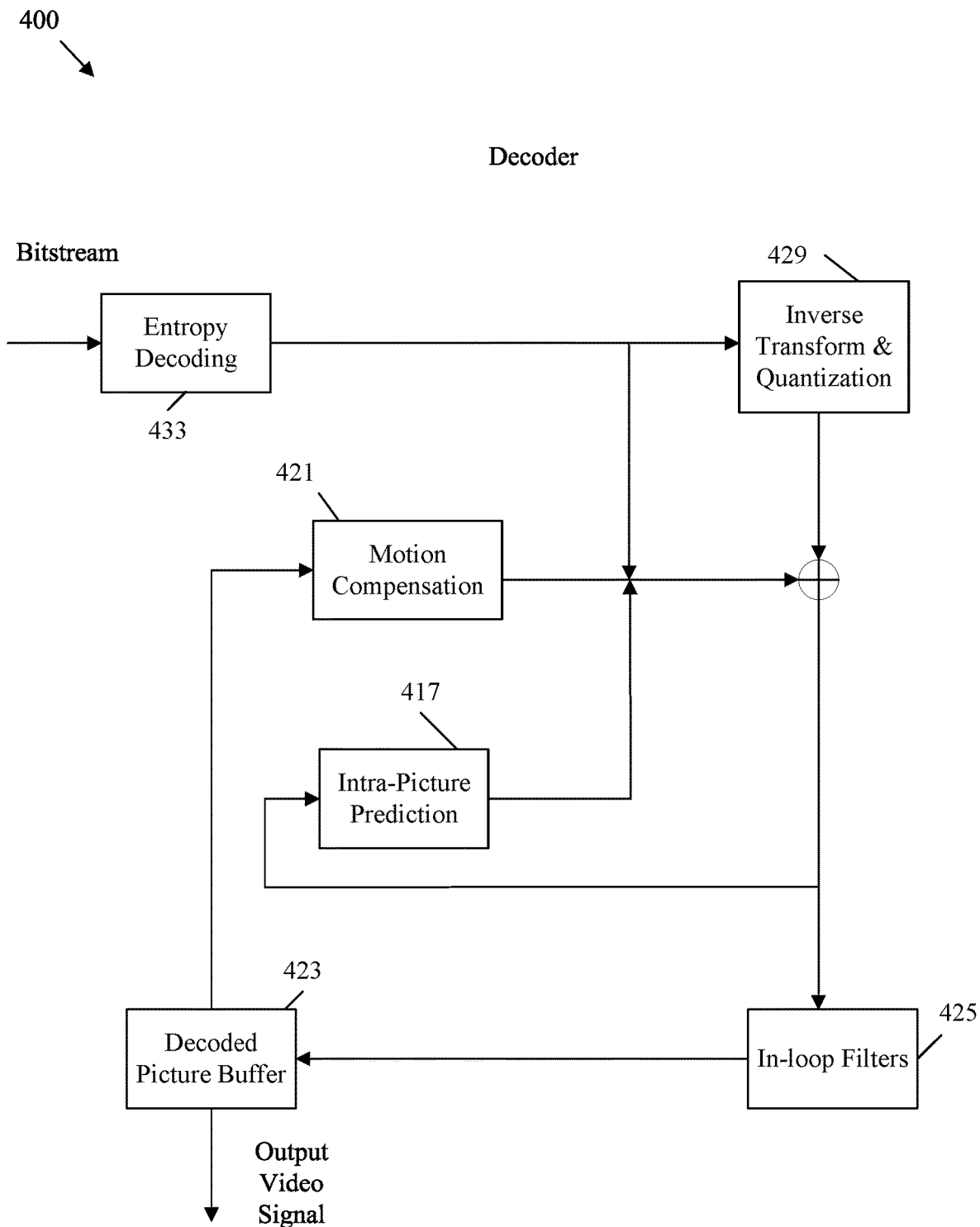
FIG. 4 is a schematic diagram illustrating an example video decoder for video coding.

FIG. 4 is a block diagram illustrating an example video decoder 400 for video coding. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

The present disclosure provides encoder and decoder designs to reduce the complexity, increase coding speed, and/or increase coding efficiency of video coding according to method 100, codec system 200, encoder 300, and/or decoder 400. Specifically, the disclosure includes mechanisms to implement constrained coding trees. Applying such constrained coding trees to specified CTUs results in splitting corresponding coding tree nodes in a manner that aligns with codec pipeline block processing mechanisms. As such, the CTUs are split into CUs that align with pipeline block boundaries. This, in turn, alleviates the necessity of providing separate mechanisms to alter pipeline block boundaries or otherwise alter pipeline block based processing so that each CU can be coded as a discrete unit. Accordingly, the embodiments discussed herein support reduced complexity and increased coding speed when applied in conjunction with method 100, codec system 200, encoder 300, and/or decoder 400 while maintaining or reducing processing and/or memory resource usage. Further, applying such constrained coding trees reduce the number of split mode options for corresponding coding tree nodes. This allows the selected split modes to be signaled in fewer bits, and hence increases coding efficiency where coding efficiency is a measure of bit rate reduction/compression that compares an uncompressed representation of data to a compressed representation of the data. As such, the embodiments discussed herein support increased coding efficiency when applied in conjunction with method 100, codec system 200, encoder 300, and/or decoder 400. Hence, the disclosed embodiments cause the method 100, codec system 200, encoder 300, and/or decoder 400 to operate in a more efficient manner by solving a technical problem associated with such systems, namely by reducing the ever increasing complexity and increasing speed of such systems while still supporting the beneficial compression associated with such systems. Specific example embodiments of multi-stage encoders, decoders, and associated methods for use in conjunction with method 100, codec system 200, encoder 300, and/or decoder 400 are discussed herein below.

Figure 5:
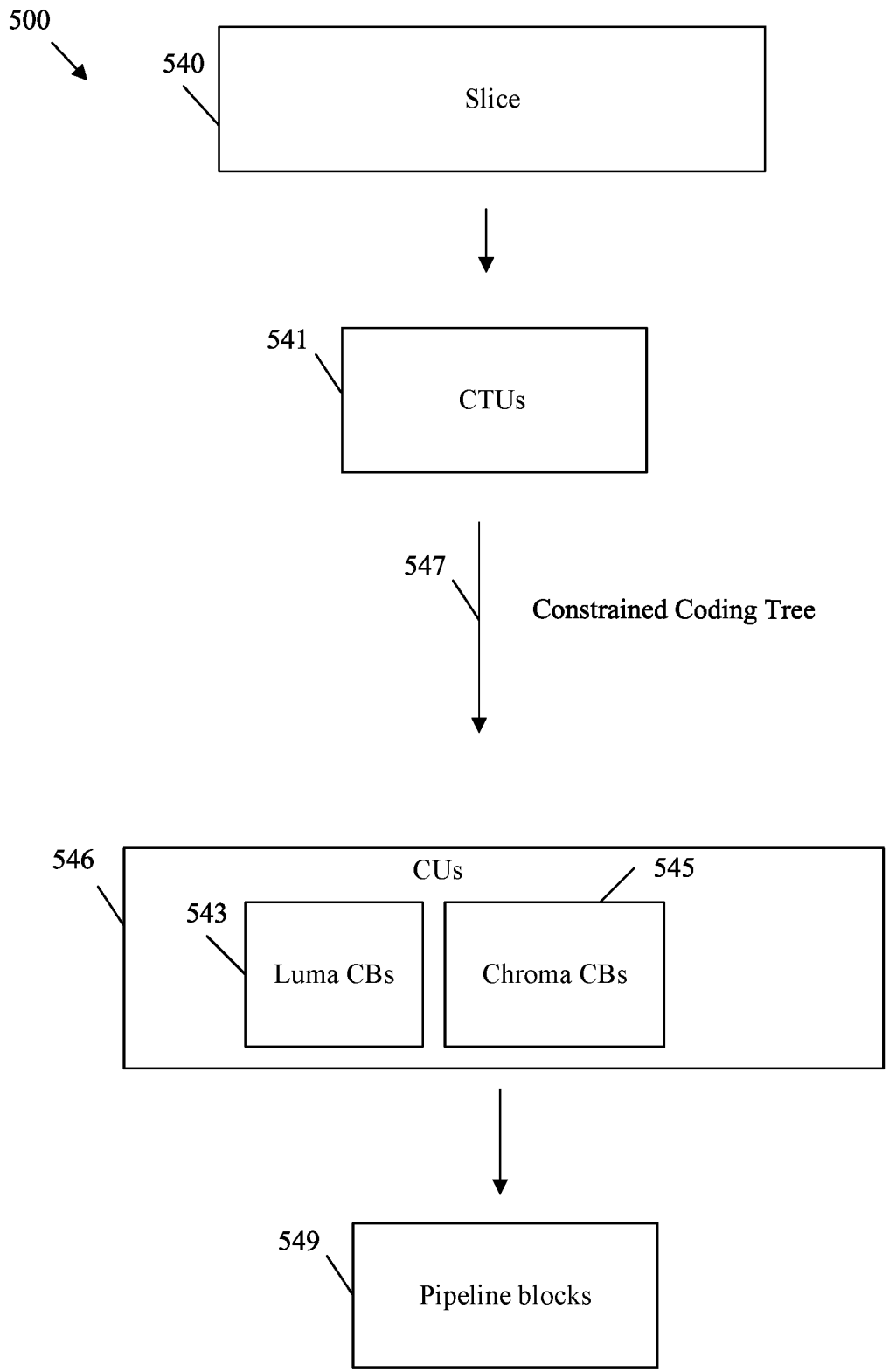
FIG. 5 is a schematic diagram illustrating an example mechanism of partitioning a coding tree unit (CTU) into coding units (CUs).

FIG. 5 is a schematic diagram illustrating an example mechanism 500 of partitioning a CTU into coding units (CUs) that align with pipeline blocks. Mechanism 500 may be employed by method 100, codec system 200, encoder system 300, and/or decoder system 400 when partitioning video frames.

A video frame is received and partitioned into one or more slices 540. A slice 540 is a spatially distinct region of a frame that is encoded separately from other regions in the same frame. Regions of the frame are assigned to slices 540 based on an assigned coding mechanism for the corresponding region. Regions of a frame that are designated for unidirectional inter-prediction and bidirectional inter-prediction are assigned to P and B slices 540, respectively. Regions of the frame that are designated for intra-prediction are assigned to I slices 540.

The slices 540 are divided into CTUs 541. A CTU 541 is a largest block of pixels that can accept application of a complete constrained coding tree 547 (e.g., a coding tree 547 does not generally span across CTU 541 boundaries). A CTU 541 size is defined by syntax, and may be, for example, one hundred twenty eight pixels by one hundred twenty eight pixels, sixty-four pixels by sixty-four pixels, thirty-two pixels by thirty-two pixels, etc. Such sizes are generally expressed in the form of width by height. A CTU 541 may also be a rectangle in some examples, and may be, for example one hundred twenty eight pixels by sixty four pixels. Such sizes are generally expressed in the form of width by height. Hence, a CTU 541 of one hundred twenty eight pixels by sixty four pixels is twice as wide as tall. A CTU 541 contains both luma samples and chroma samples. A luma sample is a light value and a chroma sample is a color value. It should be noted that luma samples and chroma samples can also be referred to as luma data and chroma data, respectively, in some contexts.

A constrained coding tree 547 is applied to partition the luma samples and/or the chroma samples of the CTU 541. A coding tree is a list of decision nodes related by child and/or parent relationships. Each node is associated with a split mode that partitions corresponding samples. The first node (e.g., root node) of the constrained coding tree 547 applies a split mode to partition the luma samples and/or chroma samples into corresponding portions. Child nodes recursively apply further split modes to subdivide corresponding portions into smaller portions until the branches of the constrained coding tree 547 are reached. The coding tree node is a constrained coding tree node 547 as the available split modes are limited for some coding tree nodes. Specifically, when a coding tree node height is twice a maximum TU height and the coding tree node width is twice a maximum TU width (e.g., 128×128 pixels and/or 2S×2S), the split mode is selected from a group consisting of a quad-tree split, a horizontal binary-tree split, and no split. Accordingly, the coding tree is constrained from selecting a split mode for the coding tree node from the group of a vertical binary-tree split, a vertical triple-tree split, and a horizontal triple-tree split. Further, when a coding tree node height is not larger than a maximum TU height and a coding tree node width is twice a maximum TU width (e.g., 128×64 pixels and/or 2S×S), the split mode is selected from a group consisting of a vertical binary-tree split and no split. Accordingly, the coding tree is constrained from selecting a split mode for the coding tree node from the group of a horizontal binary-tree, a quad-tree split, a vertical triple-tree, and a horizontal triple-tree.

It should be noted that a TU is a transform block applied to a residual created as the result of inter-prediction and/or intra-prediction. A maximum TU height and/or width indicates that maximum size of TU block that can be applied to transform a residual of a CU 546. A maximum TU size can be employed when assigning CUs 546 to pipeline blocks 549. Accordingly, the maximum TU size can be employed to determine split mode selection to align with the boundaries of the pipeline blocks 549.

The constrained coding tree 547 splits the luma samples into luma coding blocks 543 and splits the chroma samples in into chroma coding blocks 545, respectively. A luma coding block 543 is a partitioned group of luma samples designated for further compression. A chroma coding block 545 is a partitioned group of chroma samples designated for further compression. There may be two chroma coding blocks 545, denoted as a red difference chroma block and a blue difference chroma block, for each luma coding block 543 to express the full range of color values. The luma coding block 543 and related chroma coding blocks 545 may be assigned to a CU 546. A CU 546 is a group of related pixel sample values that are forwarded for video compression via inter-prediction and/or intra-prediction. When the slice 540 is an I slice, the CU 546 is forwarded for intra-prediction. When the slice 540 is a P slice or a B slice, the CU 546 is forwarded for inter-prediction.

The CUs 546 are forwarded for video compression by assigning the CUs 546 into pipeline blocks 549. A pipeline block 549 is a divided portion of a CTU 541 that can be encoded and/or decoded as a group. Hence, CUs 546 assigned to a first pipeline block 549 are coded before proceeding to CUs 546 assigned to a second pipeline block 549. Pipeline blocks 549 are generally coded in a predefined order, such as left to right and top to bottom when coding a slice 540 of a frame. As noted above, pipeline blocks 549 can be assigned based on maximum TU size. If a CU 546 exists in more than one pipeline block 549, additional complexity is added to code the CU 546, for example by altering the pipeline block 549 size to admit the entire CU 546. However, applying the constrained coding tree 547 according to the rules described herein may result in CUs 546 that align with pipeline block 549 boundaries. Accordingly, such special processing may be avoided.

Figure 6:
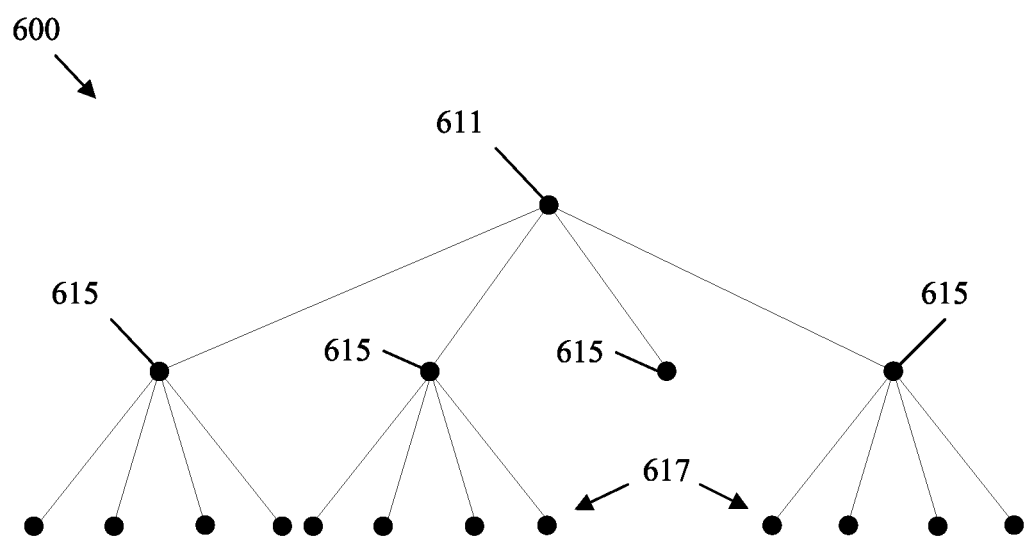
FIG. 6 illustrates an example coding tree with coding tree nodes as applied to a CTU.

FIG. 6 illustrates an example coding tree 600 as applied to a CTU, which may be substantially similar to constrained coding tree 547 and CTU 541, respectively. Accordingly, coding tree 600 may be employed by method 100, codec system 200, encoder system 300, decoder system 400, and/or mechanism 500 when partitioning video frames.

A coding tree 600 is employed to partition a CTU into CBs that make up a CU. The coding tree 600 includes a plurality of coding tree nodes, for example including a root node 611, second layer nodes 615, and third layer nodes 617, in the illustrated example. It should be noted that, while three layers of nodes are depicted, any number of layers may be employed depending on the CTU size and the minimum block size. A node 611, 615, and 617 is depicted in FIG. 6 as a black dot. A coding tree 600 node, as used herein, is a block of pixels of a corresponding size upon which a split mode can be applied to partition the block into a plurality of smaller blocks of pixels. In the example shown, the nodes employ a quad-tree split mode that splits the corresponding block into four smaller blocks. This process can continue until a predefined condition is reached. Such predefined conditions can include a minimum block size and/or signal characteristics of the block (e.g., coefficients of the data in the block in the frequency domain). For example, at a root node 611, a split mode can be applied to partition the block, in this case the CTU, into smaller blocks. A split mode with a corresponding partition is selected to separate pixels with different values into different blocks and group pixels with similar values into common blocks. The blocks partitioned at the root node 611 result in second layer nodes 615. At each node, the block is checked for signal characteristics and block size. When the signal characteristics indicate the block contains pixels of relatively similar values, the block may not be split further. Also, when the blocks reach a minimum size, the blocks may not be split further. In the example shown, three of the second layer nodes 615 are further split by applying additional split modes with corresponding partitions resulting in third layer nodes 617. In this example, one of the second layer nodes 615 is not split further, for example because signal characteristics related to the samples in the block (e.g., coefficients in the frequency domain) indicate that the block contains pixels of relatively similar values.

When used as a constrained coding tree, the nodes 611, 615, and 617 of the coding tree 600 are constrained so that only certain split modes may be selected. The split modes available for selection depend on the size of the corresponding node. Such constraints result in a partition of the CTU that aligns resulting CUs with boundaries of pipeline blocks used in some example codecs.

Figure 7:
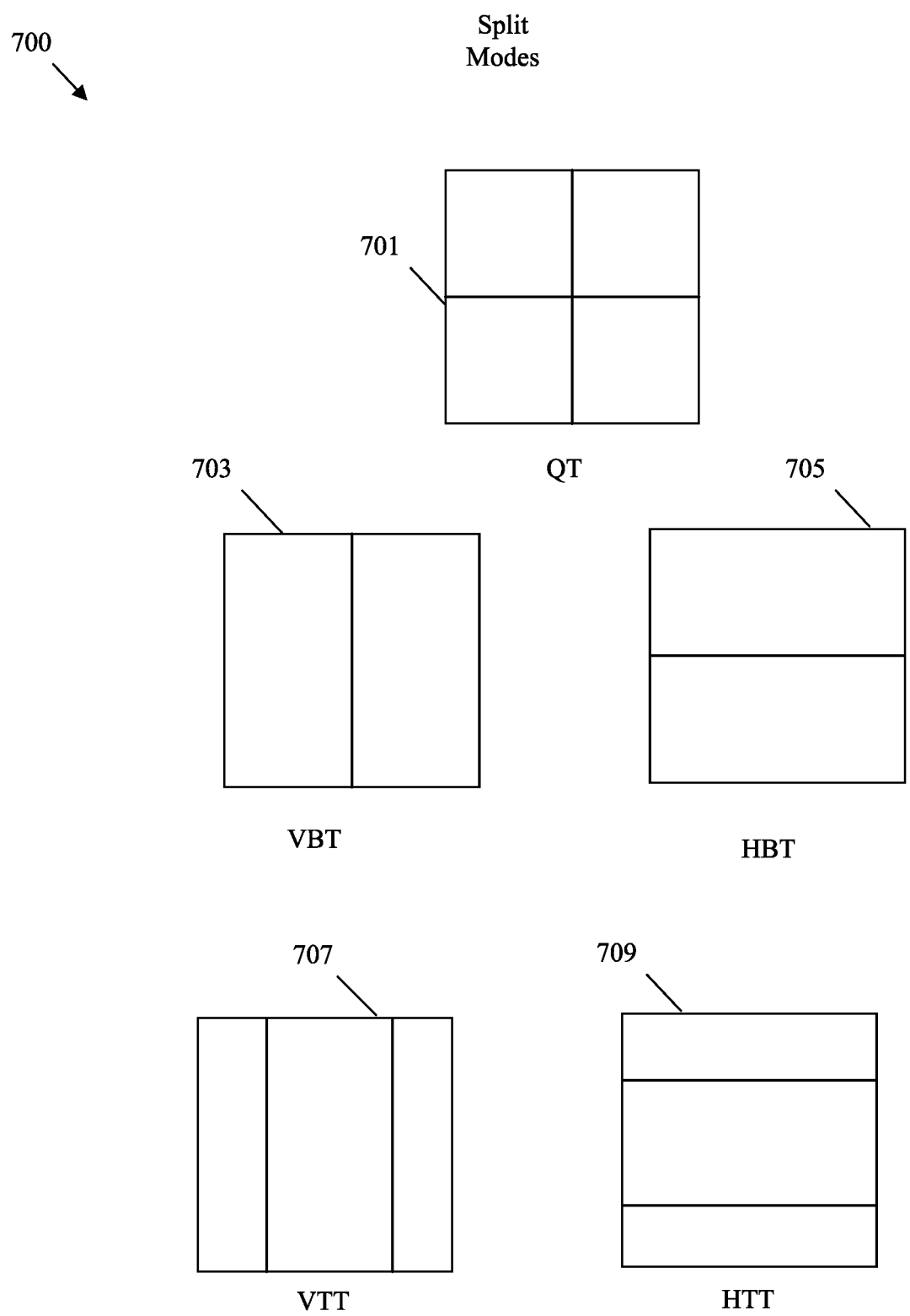
FIG. 7 is a schematic diagram illustrating an example set of split modes employed in coding trees.

FIG. 7 is a schematic diagram illustrating an example set of split modes 700 employed in coding trees, such as constrained coding tree 547 and/or coding tree 600. As such, the set of split modes 700 can be employed in mechanism 500 when operating method 100, codec system 200, encoder system 300, and/or decoder system 400 to partition video frames. The set of split modes 700 includes a quad-tree (QT) 701, a vertical binary tree (VBT) 703, a horizontal binary tree (HBT) 705, a vertical triple tree (VTT) 707, and a horizontal triple tree (HTT) 709. Each node of a coding tree applies one of the set of split modes 700 to a block of samples. Hence, a parent node in a coding tree applies a split mode to a group of samples to create two, three, or four blocks (depending on split mode). Then child nodes apply more split modes to further divide the blocks created by the parent node. Child nodes of the child nodes can further sub-divide such blocks until the end of the coding tree is reached. The split mode for a particular node is selected from the set of split modes 700 (e.g., by an RDO process at an encoder) to group samples with similar values in order to support efficient compression by intra-prediction and/or inter-prediction. At a decoder, the coding tree, sub-trees, and split modes can be determined from the bitstream, for example as stored in syntax in a parameter set for the slice, CTU, and/or corresponding coding units.

A QT 701 is a split mode that splits a coding block into four equal sub-blocks. Hence, a QT 701 splits a block of luma samples into four blocks of luma samples of equal size. Further, a QT 701 splits a block of chroma samples into four smaller blocks of chroma samples of equal size.

A VBT 703 is a split mode that splits a coding block into two sub-blocks of equal size. Such sub-blocks have the same as height and half the width of the original coding block. Hence, a VBT 703 splits a parent block of luma samples into two child blocks of luma samples of equal size with the same height and half the width of the parent block of luma samples. Further, a VBT 703 splits a parent block of chroma samples into two child blocks of chroma samples of equal size with the same height and half the width of the parent block of chroma samples.

A HBT 705 is a split mode that splits a coding block into two sub-blocks of equal size. Such sub-blocks have the same width and half the height of the original coding block. Hence, a HBT 705 splits a parent block of luma samples into two child blocks of luma samples of equal size with the same width and half the height as the parent block of luma samples. Further, a HBT 705 splits a parent block of chroma samples into two child blocks of chroma samples of equal size with the same width and half the height of the parent block of chroma samples.

A VTT 707 is a split mode that splits a coding block into three sub-blocks. Such sub-blocks have the same height as the original coding block. One of the sub-blocks has half of the width of the original coding block and two of the sub-blocks have a width of one quarter of the original coding block. Hence, a VTT 707 splits a parent block of luma samples into three child blocks of luma samples with the same height as the parent block of luma samples and with one quarter, one half, and one quarter of the width of the parent block of luma samples, respectively. Further, a VTT 707 splits a parent block of chroma samples into three child blocks of chroma samples with the same height as the parent block of chroma samples and with one quarter, one half, and one quarter of the width of the parent block of chroma samples, respectively.

A HTT 709 is a split mode that splits a coding block into three sub-blocks. Such sub-blocks have the same width as the original coding block. One of the sub-blocks has half of the height of the original coding block and two of the sub-blocks have a height of one quarter of the original coding block. Hence, a HTT 709 splits a parent block of luma samples into three child blocks of luma samples with the same width as the parent block of luma samples and with one quarter, one half, and one quarter of the height of the parent block of luma samples, respectively. Further, a HTT 709 splits a parent block of chroma samples into three child blocks of chroma samples with the same width as the parent block of chroma samples and with one quarter, one half, and one quarter of the height of the parent block of chroma samples, respectively.

Figure 8:
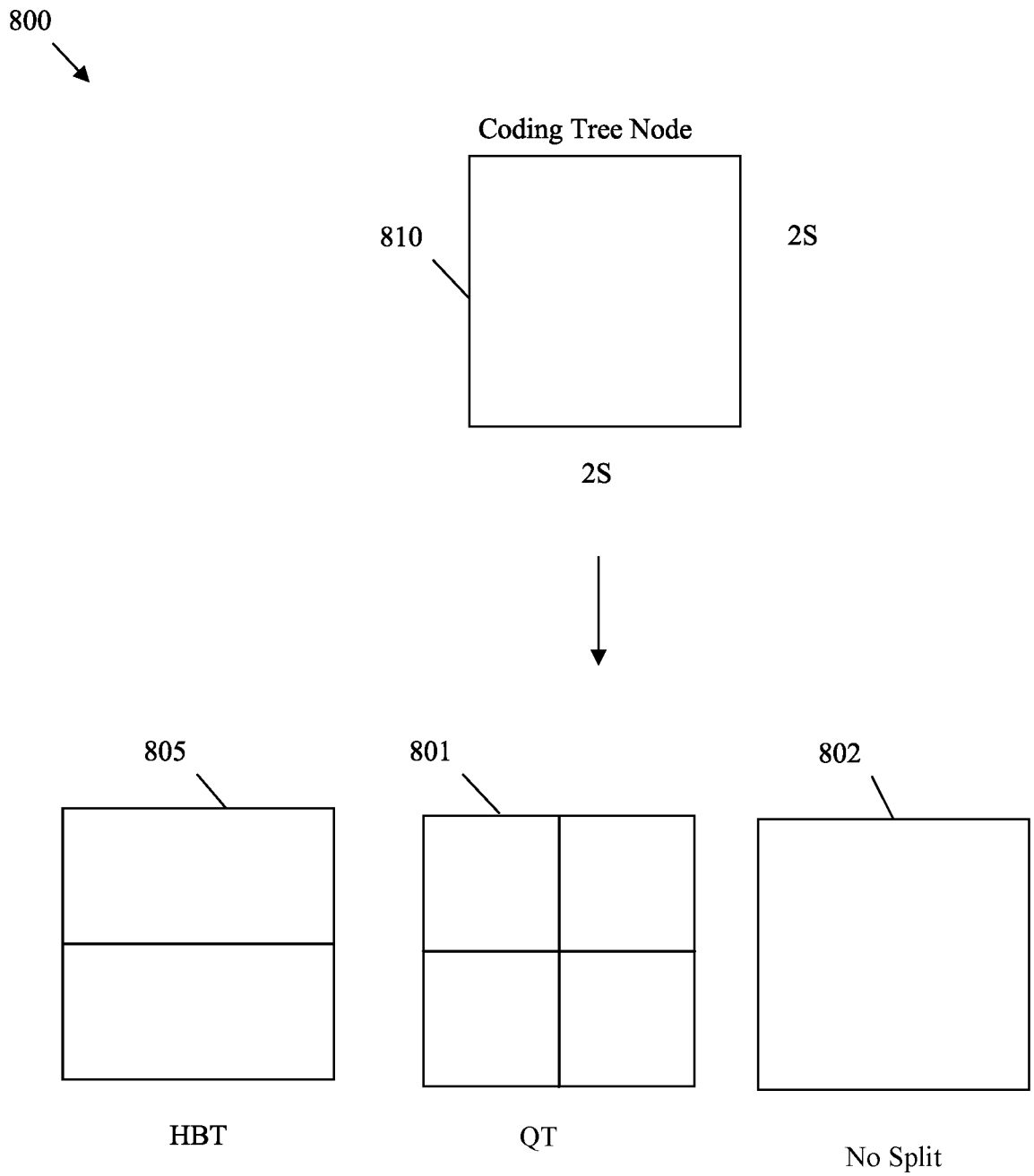
FIGS. 8-9 are a schematic diagrams illustrating example constraints applied by a constrained coding tree when selecting split modes to partition coding tree nodes.
Figure 9:
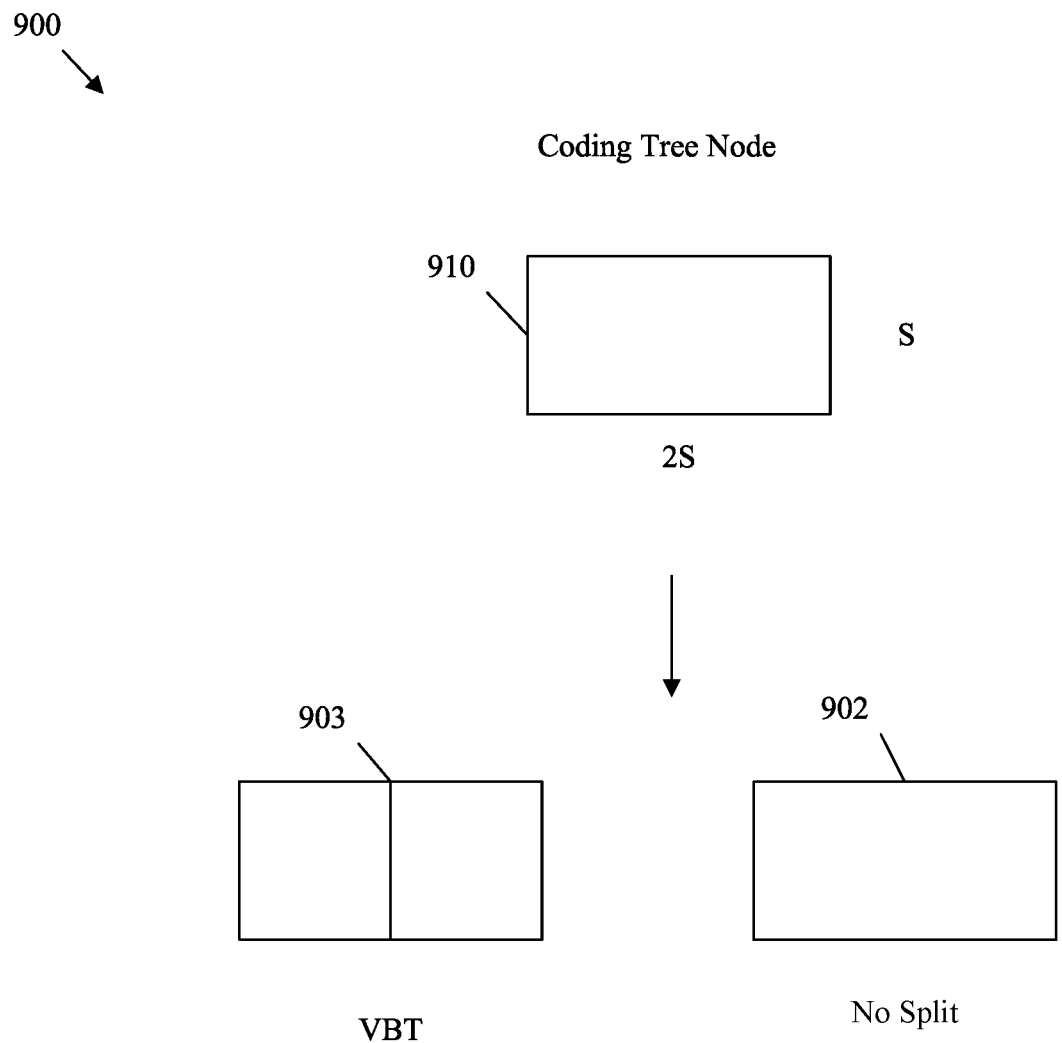

FIGS. 8-9 are schematic diagrams 800 and 900 illustrating example constraints applied by a constrained coding tree when selecting split modes to partition coding tree nodes. Specifically, in diagram 800, a coding tree node 810 is to be split by a split mode, such as split modes 700, during application of a coding tree, such as constrained coding tree 547 and/or coding tree 600. As such, schematic diagram 800 can be employed in mechanism 500 when operating method 100, codec system 200, encoder system 300, and/or decoder system 400 to partition video frames.

The coding tree node 810 can be an entire CTU or a child node resulting from the split of a CTU. The coding tree node 810 is a 2S×2S node, which indicates the coding tree node 810 is at least twice the height of the maximum TU and twice the width of the maximum TU. According to the constraints described herein, due to the dimensions of the coding tree node 810, the coding tree node 810 can only be split by a QT split 801, a HBT split 805, or no split 802. The QT split 801 and the HBT split 805 are substantially similar to QT 701 and HBT 705, respectively. No split 802 indicates that the coding tree node 810 is not split further and becomes a CU.

Specifically, a quad-tree triple tree coding tree structure may be used in this example. A maximum CTU size may be 128×128 and maximum TU size may be 64×64. The maximum binary tree size (indicating the maximum-sized node that is allowed to use binary tree split and triple tree split) can be set as up to 128×128. In this example, a 2S×2S coding tree node 810 may be a 128×128 node (which is a CTU). A horizontal triple tree split and vertical triple tree split are not allowed for this coding tree node 810 since child nodes from a triple tree split in this case may be covered by more than one S×S pipeline block. In addition, a vertical binary tree split is also not allowed for this coding tree node 810 because such a split may cause the S×S pipeline blocks to be processed in an order that is different from a quad-tree node processing order generally used by such systems. Therefore, the node is only allowed to be split by a quad-tree split or a horizontal binary tree split.

Accordingly, the split mode for a coding tree node 810 can be signaled by a pair of flag/bins. Specifically, a decoder can parse a bin (e.g., a qt_split_cu_flag) to determine whether the 128×128 coding tree node 810 is split by a QT split 801. If the 128×128 coding tree node 810 is split by a QT split 801, four 64×64 child nodes are generated. If the 128×128 coding tree node 810 is not split by a QT split 801, a second bin (e.g., the mtt_split_cu_flag) is parsed from the bitstream to determine whether the coding tree node 810 is not to split, resulting in no split 802, or split by a HBT split 805. If the second bin indicates the coding tree node 810 is to be split, a HBT split 805 is inferred, and two 128×64 nodes are generated by the horizontal binary split. If the HBT split 805 is not to be split, a 128×128 CU is formed. The CU is inferred to have a four 64×64 TU and a 128×128 prediction unit (PU). The 128×128 PU can be divided into four 64×64 PUs, and the four TUs and the corresponding PUs form four 64×64 pipeline blocks. The pipeline blocks can then be processed in a quad-tree node processing order, such as the top-left TU is processed first, followed by the top-right TU, the bottom-left TU, and the bottom-right TU.

In diagram 900, a coding tree node 910 is to be split by a split mode, such as split modes 700, during application of a coding tree, such as constrained coding tree 547 and/or coding tree 600. As such, schematic diagram 900 can be employed in mechanism 500 when operating method 100, codec system 200, encoder system 300, and/or decoder system 400 to partition video frames.

The coding tree node 910 can be an entire CTU or a child node resulting from the split of a CTU. The coding tree node 910 is a 2S×S node, which indicates the coding tree node 910 height is not larger than a maximum TU height and the coding tree node 910 width is twice a maximum TU width. According to the constraints described herein, due to the dimensions of the coding tree node 910, the coding tree node 910 can only be split by VBT split 903 or no split 902. The VBT split 903 is substantially similar to VBT 703. No split 902 indicates that the coding tree node 910 is not split further and becomes a CU.

For example, a 2S×S coding tree node 910 may be a 128×64 node (which is a CTU). The 128×64 coding tree node 910 is not allowed to use a horizontal triple tree split, a vertical triple tree split, or horizontal binary tree split, in order not to break a 64×64 block pipeline structure. The 128×64 coding tree node 910 also cannot be split by quad-tree split. This is because, in a quad tree-binary triple tree structure, a node generated by a binary tree split or a triple tree split is not allowed to be split by a quad-tree split. In this case, the only split allowed for the 128×64 coding tree node 910 is a VBT split 903. Hence, the split direction information (e.g., the mtt_split_cu_vertical_flag) and split type information (e.g., the mtt_split_cu_binary_flag) may not be signaled if coding tree node 910 is split. It should also be noted that the 64×64 nodes partitioned from the 128×64 coding tree node 910 are allowed to be split by either a triple tree split or a binary tree split.

Figure 10:
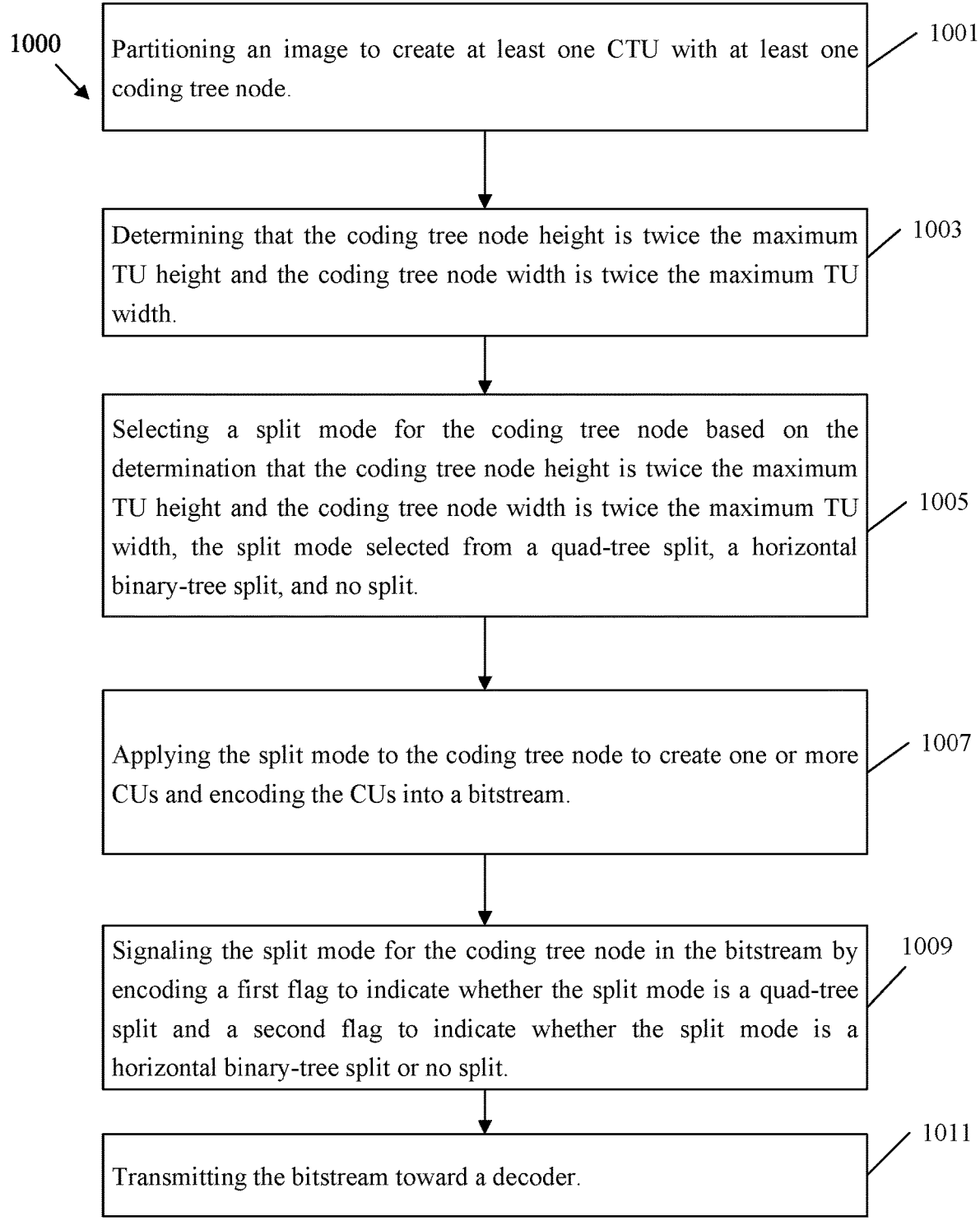
FIG. 10 is a flowchart of an example method of applying a constrained coding tree to partition a coding tree node of a CTU during encoding.

FIG. 10 is a flowchart of an example method 1000 of applying a constrained coding tree, such as constrained coding tree 547 and/or coding tree 600, to partition a coding tree node, such as coding tree node 810, of a CTU, such as CTU 541 during encoding. Method 1000 may be employed to implement mechanism 500 by employing the set of split modes 700. Method 1000 can be employed in method 100, codec system 200, and/or an encoder system 300 to partition samples from video frames into CUs for use in pipeline blocks.

At step 1001, an image is partitioned into slices at an encoder. The slices are further processed to create at least one CTU. Further, a coding tree is determined for the CTU so that the CTU contains at least one coding tree node.

At step 1003, the encoder determines that a height of the coding tree node is twice a maximum TU height and a width of the coding tree node is twice a maximum TU width. Specifically, the encoder determines the coding tree node is a 2S×2S node (e.g., 128×128 pixels) such as coding tree node 810.

At step 1005, the encoder selects a split mode for the coding tree node based on the determination that the coding tree node height is twice the maximum TU height and the coding tree node width is twice the maximum TU width. Specifically, the split mode selected from a group including (e.g., consisting substantially of) a quad-tree split, a horizontal binary-tree split, and no split. For example, the split mode is not selected from a vertical binary-tree split, a vertical triple-tree split, and a horizontal triple-tree split based on the determination that the coding tree node height is twice the maximum TU height and the coding tree node width is twice the maximum TU width. At step 1007, the encoder applies the split mode to the coding tree node to create one or more CUs and encodes the CUs into a bitstream.

At step 1009, the encoder can signal the split mode for the coding tree node, as selected at step 1005, in the bitstream. For example, the encoder can encode a first flag to indicate whether the split mode is a quad-tree split and encode a second flag to indicate whether the split mode is a horizontal binary-tree split or no split. For example, the first flag can be a qt_split_cu_flag and the second flag can be a mtt_split_cu_flag. It should be noted that step 1009 may occur before or after step 1007 depending on the example. At step 1011, the encoder transmits the bitstream toward a decoder for reconstruction into a video stream and display to a user.

Figure 11:
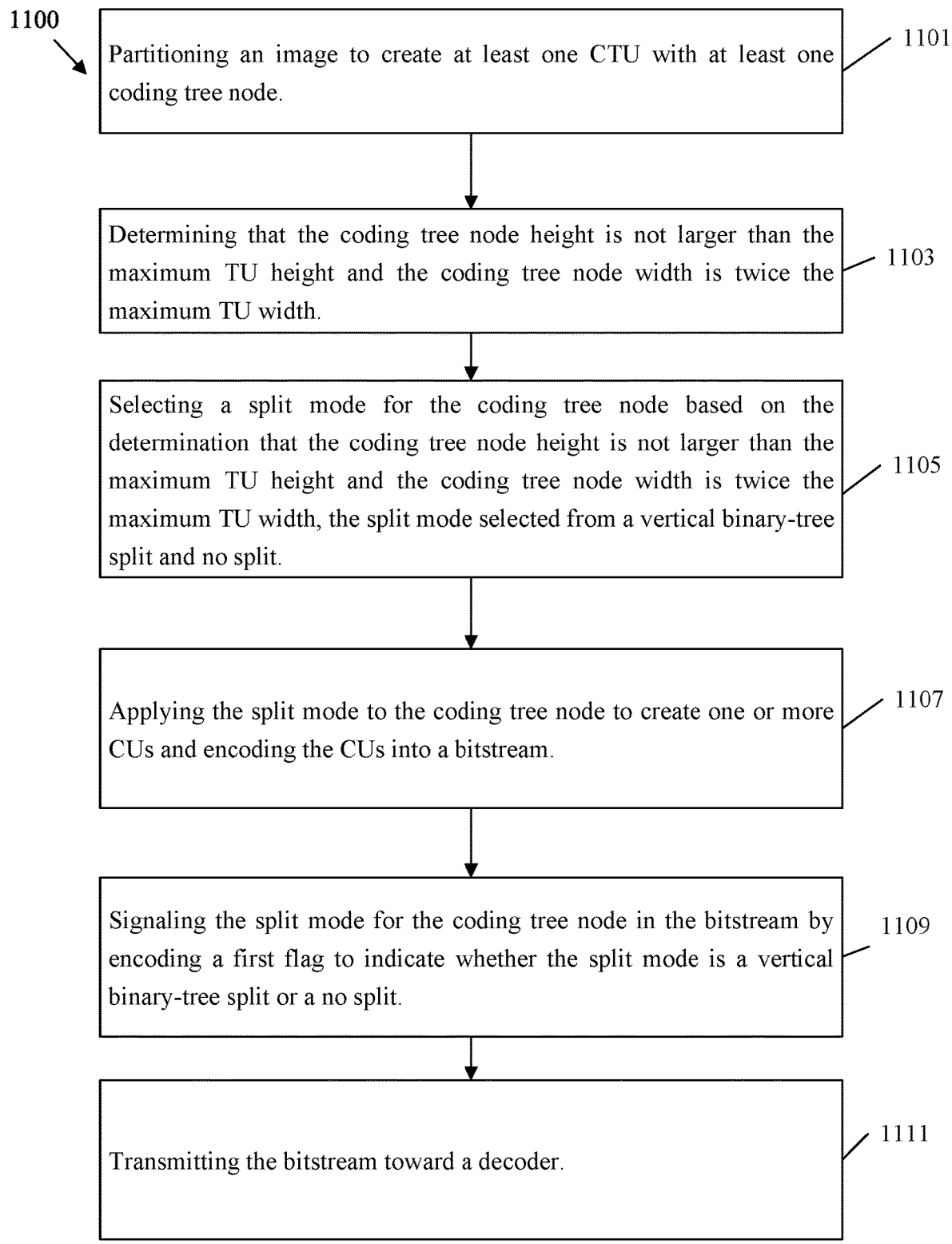
FIG. 11 is a flowchart of another example method of applying a constrained coding tree to partition a coding tree node of a CTU during encoding.

FIG. 11 is a flowchart of another example method 1100 of applying a constrained coding tree, such as constrained coding tree 547 and/or coding tree 600, to partition a coding tree node, such as coding tree node 910, of a CTU, such as CTU 541 during encoding. Method 1100 may be employed to implement mechanism 500 by employing the set of split modes 700. Method 1100 can be employed in method 100, codec system 200, and/or an encoder system 300 to partition samples from video frames into CUs for use in pipeline blocks.

At step 1101, an image is partitioned into slices at an encoder. The slices are further processed to create at least one CTU. Further, a coding tree is determined for the CTU so that the CTU contains at least one coding tree node.

At step 1103, the encoder determines that a height of the coding tree node is not larger than a maximum TU height and a width of the coding tree node is twice a maximum TU width. Specifically, the encoder determines the coding tree node is a 2S×S node (e.g., 128×64 pixels) such as coding tree node 910.

At step 1105, the encoder selects a split mode for the coding tree node based on the determination that the coding tree node height is not larger than the maximum TU height and the coding tree node width is twice the maximum TU width. Specifically, the split mode selected from a group including (e.g., consisting substantially of) a vertical binary-tree split and no split. For example, the split mode is not selected from a horizontal binary-tree, a quad-tree split, a vertical triple-tree, and a horizontal triple-tree based on the determination that the coding tree node height is not larger than the maximum TU height and the coding tree node width is twice the maximum TU width. At step 1007, the encoder applies the split mode to the coding tree node to create one or more CUs and encodes the CUs into a bitstream.

At step 1109, the encoder can signal the split mode for the coding tree node, as selected at step 1105, in the bitstream. For example, the encoder can signal the split mode for the coding tree node in the bitstream by encoding a first flag to indicate whether the split mode is a vertical binary-tree split or a no split. It should be noted that step 1109 may occur before or after step 1107 depending on the example. At step 1111, the encoder transmits the bitstream toward a decoder for reconstruction into a video stream and display to a user.

Figure 12:
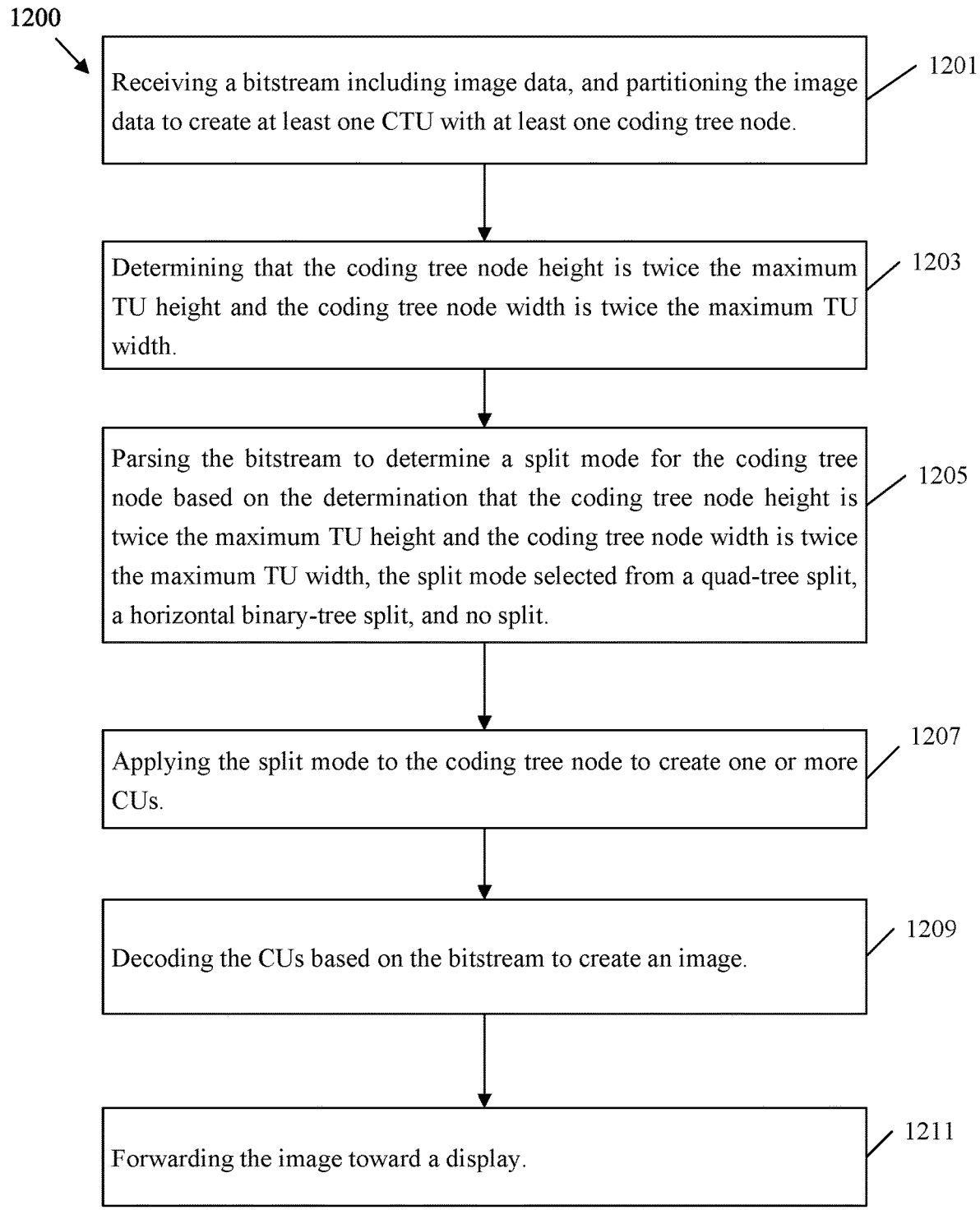
FIG. 12 is a flowchart of an example method of applying a constrained coding tree to partition a coding tree node of a CTU during decoding.

FIG. 12 is a flowchart of an example method 1200 of applying a constrained coding tree, such as constrained coding tree 547 and/or coding tree 600, to partition a coding tree node, such as coding tree node 810, of a CTU, such as CTU 541 during decoding. Method 1200 may be employed to implement mechanism 500 by employing the set of split modes 700. Method 1200 can be employed in method 100, codec system 200, and/or a decoder system 400 to partition samples from video frames into CUs for use in pipeline blocks.

At step 1201, a bitstream including image data is received at a decoder. The decoder can partition the image data into slices of a predetermined size. The slices are further processed to create at least one CTU according to predetermined algorithms, slice sizes, etc. Further, a coding tree is determined for the CTU, for example from the bitstream, so that the CTU contains at least one coding tree node.

At step 1203, the decoder determines that a height of the coding tree node is twice a maximum TU height and a width of the coding tree node is twice a maximum TU width. Specifically, the decoder determines the coding tree node is a 2S×2S node (e.g., 128×128 pixels) such as coding tree node 810.

At step 1205, the decoder parses the bitstream to determine a split mode for the coding tree node based on the determination that the coding tree node height is twice the maximum TU height and the coding tree node width is twice the maximum TU width.

Specifically, the split mode selected from a group including (e.g., consisting substantially of) a quad-tree split, a horizontal binary-tree split, and no split. For example, the split mode is not selected from a vertical binary-tree split, a vertical triple-tree split, and a horizontal triple-tree split based on the determination that the coding tree node height is twice the maximum TU height and the coding tree node width is twice the maximum TU width. For example, parsing the bitstream to determine the split mode for the coding tree node may include parsing a first flag to determine whether the split mode is a quad-tree split. Parsing the bitstream to determine the split mode for the coding tree node may further include parsing a second flag to determine whether the split mode is a horizontal binary-tree split or no split. In some examples, the first flag is a qt_split_cu_flag and the second flag is a mtt_split_cu_flag.

At step 1207, the decoder applies the split mode to the coding tree node to obtain one or more CUs. At step 1209, the decoder decodes the CUs based on the bitstream to create an image. The decoder can then forward the image to a display at step 1211.

Figure 13:
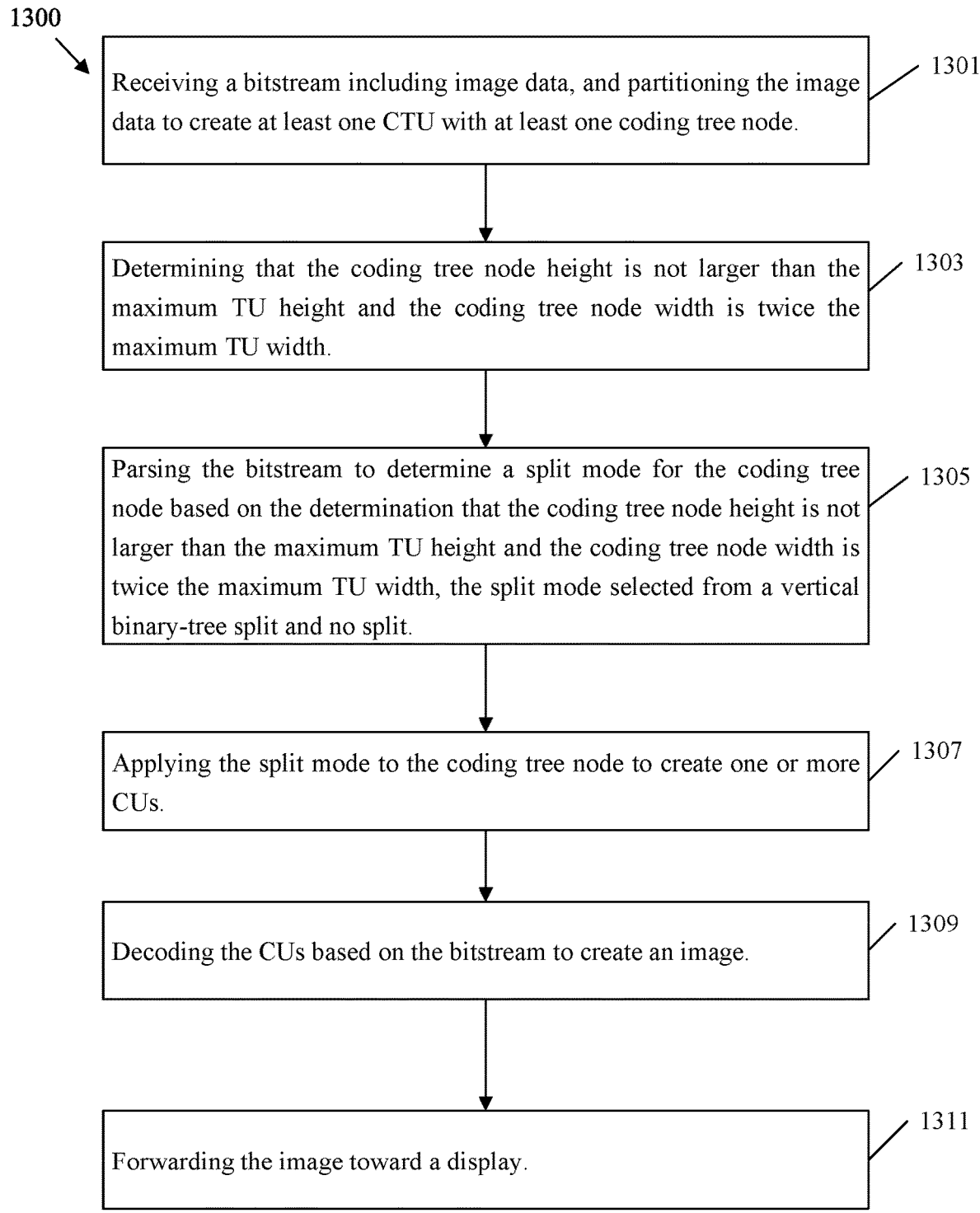
FIG. 13 is a flowchart of another example method of applying a constrained coding tree to partition a coding tree node of a CTU during decoding.

FIG. 13 is a flowchart of another example method 1300 of applying a constrained coding tree, such as constrained coding tree 547 and/or coding tree 600, to partition a coding tree node, such as coding tree node 910, of a CTU, such as CTU 541 during decoding. Method 1300 may be employed to implement mechanism 500 by employing the set of split modes 700. Method 1300 can be employed in method 100, codec system 200, and/or a decoder system 400 to partition samples from video frames into CUs for use in pipeline blocks.

At step 1301, a bitstream including image data is received at a decoder. The decoder can partition the image data into slices of a predetermined size. The slices are further processed to create at least one CTU according to predetermined algorithms, slice sizes, etc. Further, a coding tree is determined for the CTU, for example from the bitstream, so that the CTU contains at least one coding tree node.

At step 1303, the decoder determines that a height of the coding tree node is not larger than a maximum TU height and a width of the coding tree node is twice a maximum TU width. Specifically, the decoder determines the coding tree node is a 2S×S node (e.g., 128×64 pixels) such as coding tree node 910.

At step 1305, the decoder parses the bitstream to determine a split mode for the coding tree node based on the determination that the coding tree node height is not larger than the maximum TU height and the coding tree node width is twice the maximum TU width. Specifically, the split mode selected from a group including (e.g., consisting substantially of) a vertical binary-tree split and no split. For example, the split mode is not selected from a horizontal binary-tree split, a quad-tree split, a vertical triple-tree split, and a horizontal triple-tree split based on the determination that the coding tree node height is not larger than the maximum TU height and the coding tree node width is twice the maximum TU width. For example, parsing the bitstream to determine the split mode for the coding tree node may include parsing a first flag to determine whether the split mode is a vertical binary-tree split or a no split.

At step 1307, the decoder applies the split mode to the coding tree node to obtain one or more CUs. At step 1309, the decoder decodes the CUs based on the bitstream to create an image. The decoder can then forward the image to a display at step 1311.

Figure 14:
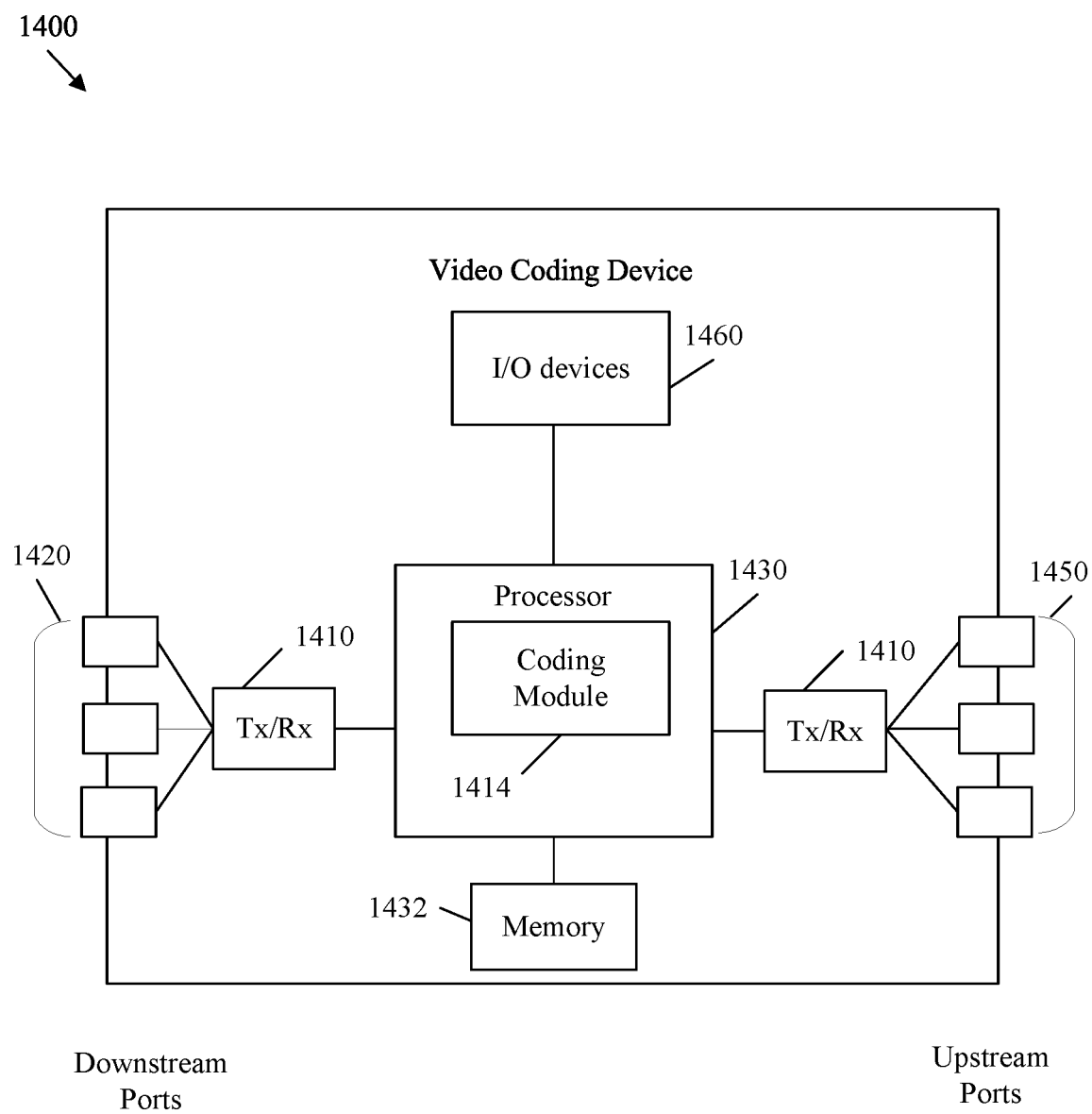
FIG. 14 is a schematic diagram of an example video coding device.

FIG. 14 is a schematic diagram of an example video coding device 1400. The video coding device 1400 is suitable for implementing the disclosed examples/embodiments as described herein. The video coding device 1400 comprises downstream ports 1420, upstream ports 1450, and/or transceiver units (Tx/Rx) 1410, including transmitters and/or receivers for communicating data upstream and/or downstream over a network. The video coding device 1400 also includes a processor 1430 including a logic unit and/or central processing unit (CPU) to process the data and a memory 1432 for storing the data. The video coding device 1400 may also comprise optical-to-electrical (OE) components, electrical-to-optical (EO) components, and/or wireless communication components coupled to the upstream ports 1450 and/or downstream ports 1420 for communication of data via optical or wireless communication networks. The video coding device 1400 may also include input and/or output (I/O) devices 1460 for communicating data to and from a user. The I/O devices 1460 may include output devices such as a display for displaying video data, speakers for outputting audio data, etc. The I/O devices 1460 may also include input devices, such as a keyboard, mouse, trackball, etc., and/or corresponding interfaces for interacting with such output devices.

The processor 1430 is implemented by hardware and software. The processor 1430 may be implemented as one or more CPU chips, cores (e.g., as a multi-core processor), field-programmable gate arrays (FPGAs), application specific integrated circuits (ASICs), and digital signal processors (DSPs). The processor 1430 is in communication with the downstream ports 1420, Tx/Rx 1410, upstream ports 1450, memory 1432, and/or I/O devices 1460. The processor 1430 comprises a coding module 1414. The coding module 1414 implements the disclosed embodiments (e.g., encoders, decoders, codecs, methods, or other mechanisms) described herein. As such, coding module 1414 improves the functionality of the video coding device 1400 as well as addresses problems that are specific to the video coding arts. Further, coding module 1414 effects a transformation of the video coding device 1400 to a different state. Alternatively, the coding module 1414 can be implemented as instructions stored in the memory 1432 and executed by the processor 1430 (e.g., as a computer program product stored on a non-transitory medium).

The memory 1432 comprises one or more memory types such as disks, tape drives, solid-state drives, read only memory (ROM), random access memory (RAM), flash memory, ternary content-addressable memory (TCAM), static random-access memory (SRAM), etc. The memory 1432 may be used as an over-flow data storage device, to store programs when such programs are selected for execution, and to store instructions and data that are read during program execution.

Figure 15:
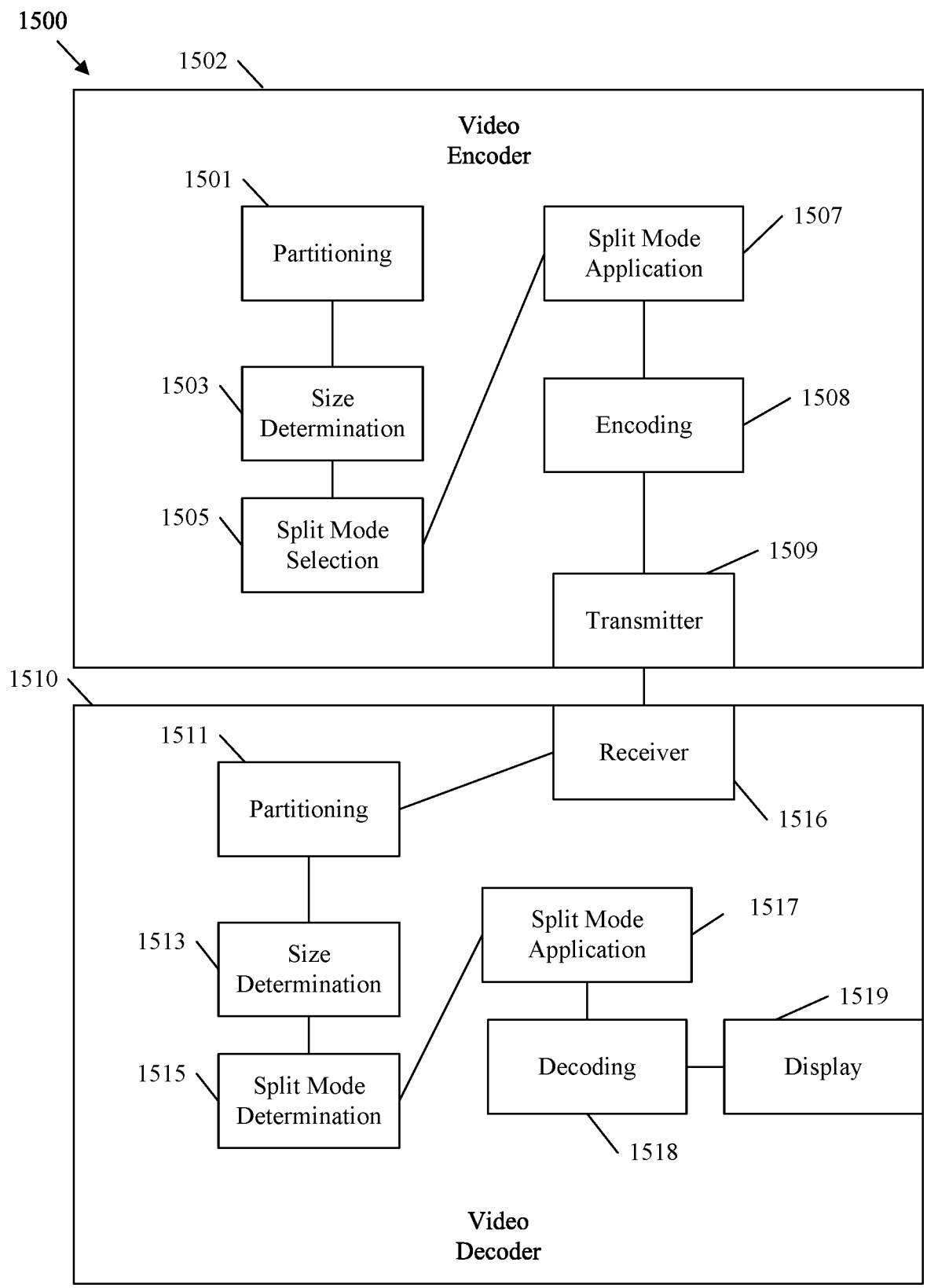
FIG. 15 is a schematic diagram of an example system for applying a constrained coding tree to partition a coding tree node of a CTU.

FIG. 15 is a schematic diagram of an example system 1500 for applying a constrained coding tree to partition a coding tree node of a CTU. The system 1500 includes a video encoder 1502 and a video decoder 1510, which can implement operating method 100, mechanism 500, method 1000, method 1100, method 1200, method 1300, codec system 200, encoder 300, and/or decoder 400. Further, the video encoder 1502 and video decoder 1510 can perform partitioning with constrained coding trees 547 and/or coding trees 600 by employing the set of split modes 700. Specifically, the video encoder 1502 and video decoder 1510 can apply coding trees that are constrained for application to coding tree nodes 810 and/or 910 in diagrams 800 and 900, respectively.

In one example, the video encoder 1502 includes a partitioning module 1501 for partitioning an image to create at least one CTU with at least one coding tree node. The video encoder 1502 also comprises a size determination module 1503 for determining that a height of the coding tree node is twice a maximum TU height and a width of the coding tree node is twice a maximum TU width. The video encoder 1502 also comprises a split mode selection module 1505 for selecting a split mode for the coding tree node based on the determination that the coding tree node height is twice the maximum TU height and the coding tree node width is twice the maximum TU width, a horizontal binary-tree split, and no split. The video encoder 1502 also comprises a split mode application module 1507 for applying the split mode to the coding tree node to create one or more CUs. The video encoder 1502 also comprises an encoding module 1508 for encoding the CUs into a bitstream. The video encoder 1502 also comprises a transmitting module 1509 for transmitting the bitstream toward a decoder.

In another example, the video encoder 1502 includes a partitioning module 1501 for partitioning an image to create at least one CTU with at least one coding tree node. The video encoder 1502 also comprises a size determination module 1503 for determining that a height of the coding tree node is not larger than a maximum TU height and a width of the coding tree node is twice a maximum TU width. The video encoder 1502 also comprises a split mode selection module 1505 for selecting a split mode for the coding tree node based on the determination that the coding tree node height is not larger than the maximum TU height and the coding tree node width is twice the maximum TU width, the split mode selected from a vertical binary-tree split, and no split. The video encoder 1502 also comprises a split mode application module 1507 for applying the split mode to the coding tree node to create one or more CUs. The video encoder 1502 also comprises an encoding module 1508 for encoding the CUs into a bitstream. The video encoder 1502 also comprises a transmitting module 1509 for transmitting the bitstream toward a decoder.

In one example, the video decoder 1510 includes a receiving module 1516 for receiving a bitstream including image data. The video decoder 1510 further includes a partitioning module 1511 for partitioning the image data to create at least one CTU with at least one coding tree node. The video decoder 1510 further includes a size determination module 1513 for determining that a height of the coding tree node is twice a maximum TU height and a width of the coding tree node is twice a maximum TU width. The video decoder 1510 further includes a split mode determination module 1515 for parsing the bitstream to determine a split mode for the coding tree node based on the determination that the coding tree node height is twice the maximum TU height and the coding tree node width is twice the maximum TU width, the split mode selected from a quad-tree split, a horizontal binary-tree split, and no split. The video decoder 1510 further includes a split mode application module 1517 for applying the split mode to the coding tree node to obtain one or more CUs. The video decoder 1510 further includes a decoding module 1518 for decoding the CUs based on the bitstream to create an image. The video decoder 1510 further includes a display module 1519 for forwarding the image toward a display.

In another example, the video decoder 1510 includes a receiving module 1516 for receiving a bitstream including image data. The video decoder 1510 further includes a partitioning module 1511 for partitioning the image data to create at least one CTU with at least one coding tree node. The video decoder 1510 further includes a size determination module 1513 for determining that a height of the coding tree node is not larger than a maximum TU height and a width of the coding tree node is twice a maximum TU width. The video decoder 1510 further includes a split mode determination module 1515 for parsing the bitstream to determine a split mode for the coding tree node based on the determination that the coding tree node height is not larger than the maximum TU height and the coding tree node width is twice the maximum TU width, the split mode selected from a vertical binary-tree split, and no split. The video decoder 1510 further includes a split mode application module 1517 for applying the split mode to the coding tree node to obtain one or more CUs. The video decoder 1510 further includes a decoding module 1518 for decoding the CUs based on the bitstream to create an image. The video decoder 1510 further includes a display module 1519 for forwarding the image toward a display.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in a decoder, the method comprising:
   receiving a bitstream including a picture;
   partitioning the picture to obtain a coding tree unit (CTU) with a coding tree node;
   determining whether to apply a vertical binary tree split based on whether a height of the coding tree node is not greater than sixty-four and a width of the coding tree node is larger than sixty-four;
   applying the vertical binary tree split to the coding tree node to obtain one or more coding units (CUs) when the height of the coding tree node is not greater than sixty-four and the width of the coding tree node is larger than sixty-four; and
   decoding blocks of the CUs to generate a reconstructed picture,
   wherein when the vertical binary tree split is applied to the coding tree node, a multi-tree type split coding unit vertical flag (mtt_split_cu_vertical_flag) and a multi-tree type split coding unit binary flag (mtt_split_cu_binary_flag) are not signaled in the bitstream.

2. The method of claim 1, wherein determining the vertical binary tree split is allowed to be used for the coding tree node when a width of the coding tree node is less than or equal to sixty-four.

3. The method of claim 1, wherein the CTU is a constrained CTU that prevents creation of a CU covered by more than one pipeline block.

4. The method of claim 1, wherein a horizontal binary-tree split, a quad-tree split, a vertical triple-tree split, and a horizontal triple-tree split are not applied to the coding tree node when the height of the coding tree node is not larger than sixty-four and a width of the coding tree node is larger than sixty-four.

5. The method of claim 1, wherein a split mode for the coding tree node is signaled in the bitstream by a first flag indicating whether the coding tree node is split.

6. A decoder comprising:
   a receiver configured to receive a bitstream including a picture; and
   a processor coupled to the receiver and configured to:
   partition the picture to obtain a coding tree unit (CTU) with a coding tree node;
   determine whether to apply a vertical binary tree split based on whether a height of the coding tree node is not greater than sixty-four and a width of the coding tree node is larger than sixty-four;
   apply the vertical binary tree split to the coding tree node to obtain one or more coding units (CUs) when the height of the coding tree node is not greater than sixty-four and the width of the coding tree node is larger than sixty-four; and
   decode blocks of the CUs to generate a reconstructed picture,
   wherein when the vertical binary tree split is applied to the coding tree node, a multi-tree type split coding unit vertical flag (mtt_split_cu_vertical_flag) and a multi-tree type split coding unit binary flag (mtt_split_cu_binary_flag) are not signaled in the bitstream.

7. The decoder of claim 6, wherein determining the vertical binary tree split is allowed to be used for the coding tree node when a width of the coding tree node is less than or equal to sixty-four.

8. The decoder of claim 6, wherein the CTU is a constrained CTU that prevents creation of a CU covered by more than one pipeline block.

9. The decoder of claim 6, wherein a horizontal binary-tree split, a quad-tree split, a vertical triple-tree split, and a horizontal triple-tree split are not applied to the coding tree node when the height of the coding tree node is not larger than sixty-four and a width of the coding tree node is larger than sixty-four.

10. The decoder of claim 6, wherein a split mode for the coding tree node is signaled in the bitstream by a first flag indicating whether the coding tree node is split.

11. The decoder of claim 6, wherein a horizontal triple tree split, a vertical triple tree split, or a horizontal binary tree split are not allowed to be used on a coding tree node when a height of the coding tree node is 64 and a width of the coding tree node is 128.

12. An encoding method implemented in an encoder, the method comprising:
    partitioning a picture to obtain a coding tree unit (CTU) with a coding tree node;
    determining whether to apply a vertical binary tree spilt based on whether a height of the coding tree node is not greater than sixty-four and a width of the coding tree node is larger than sixty-four;
    applying the vertical binary tree split to the coding tree node to obtain one or more coding units (CUs) when the height of the coding tree node is not greater than sixty-four and the width of the coding tree node is larger than sixty-four; and
    encoding the CUs into a bitstream,
    wherein when the vertical binary tree split is applied to the coding tree node, a multi-tree type split coding unit vertical flag (mtt_split_cu_vertical_flag) and a multi-tree type split coding unit binary flag (mtt_split_cu_binary_flag) are not signaled in the bitstream.

13. The method of claim 12, wherein determining the vertical binary tree split is allowed to be used for the coding tree node when a width of the coding tree node is less than or equal to sixty-four.

14. The method of claim 12, wherein the CTU is a constrained CTU that prevents creation of a CU covered by more than one pipeline block.

* * * * *

UNITED STATES PATENT AND TRADEMARK OFFICE
CERTIFICATE OF CORRECTION

| | | |
|---|---|---|
| PATENT NO. | : 12,495,168 B2 | Page 1 of 1 |
| APPLICATION NO. | : 18/194459 | |
| DATED | : December 9, 2025 | |
| INVENTOR(S) | : Jianle Chen et al. | |

It is certified that error appears in the above-identified patent and that said Letters Patent is hereby corrected as shown below:

On the Title Page

Item (72) Inventors: Delete "Yin Zhao, Guangdong (CN);" and
Insert -- Yin Zhao, Shenzhen (CN); --

Signed and Sealed this
Third Day of February, 2026

John A. Squires
*Director of the United States Patent and Trademark Office*